United States Patent
Winter et al.

(10) Patent No.: US 9,993,749 B2
(45) Date of Patent: Jun. 12, 2018

(54) FAST PRODUCTION OF HIGH QUALITY GRAPHENE BY LIQUID PHASE EXFOLIATION

(71) Applicant: UNIVERSITY OF MASSACHUSETTS, Boston, MA (US)

(72) Inventors: Horst Henning Winter, Amherst, MA (US); Christos Dimitrakopoulos, Suffield, CT (US)

(73) Assignee: University of Massachusetts, Boston, MA (US)

( * ) Notice: Subject to any disclaimer, the term of this patent is extended or adjusted under 35 U.S.C. 154(b) by 0 days. days.

(21) Appl. No.: 15/360,511

(22) Filed: Nov. 23, 2016

(65) Prior Publication Data
US 2017/0144889 A1  May 25, 2017

Related U.S. Application Data

(60) Provisional application No. 62/258,770, filed on Nov. 23, 2015.

(51) Int. Cl.
| | | |
|---|---|---|
| C01B 31/02 | (2006.01) | |
| B01D 21/26 | (2006.01) | |
| C01B 32/19 | (2017.01) | |
| B82Y 40/00 | (2011.01) | |
| B82Y 30/00 | (2011.01) | |

(52) U.S. Cl.
CPC .......... B01D 21/262 (2013.01); C01B 32/19 (2017.08); B82Y 30/00 (2013.01); B82Y 40/00 (2013.01); C01B 2204/04 (2013.01); Y10S 977/734 (2013.01); Y10S 977/842 (2013.01)

(58) Field of Classification Search
CPC .......... C01B 31/0423; C01B 31/0469; C01B 31/0478; B01D 21/262; Y10S 977/734; Y10S 977/942; B82Y 40/00; B82Y 30/00
See application file for complete search history.

(56) References Cited

U.S. PATENT DOCUMENTS 9,327,984 B2   5/2016   Chang et al.

OTHER PUBLICATIONS

Hernandez, Yenny, et al. "High-yield production of graphene by liquid-phase exfoliation of graphite." Nature nanotechnology 3.9 (2008): 563-568.*
Paton, Keith R., et al. "Scalable production of large quantities of defect-free few-layer graphene by shear exfoliation in liquids." Nature materials 13.6 (2014): 624-630.*
Zhang, Xiaoyan, et al. "Dispersion of graphene in ethanol using a simple solvent exchange method." Chemical Communications 46.40 (2010): 7539-7541.*

(Continued)

*Primary Examiner* — Richard M Rump
(74) *Attorney, Agent, or Firm* — Hamilton, Brook, Smith & Reynolds, P.C.

(57) ABSTRACT

A method of exfoliating graphite into graphene uses a sequence of flow and sonication on graphite suspensions. Graphite particles after intense mixing/grinding in a liquid are found to be altered, graphite having curled-up edges, which increases its sensitivity to ultrasound. Quadrupled graphene yield is achieved through introducing chaotic flow pretreatment.

14 Claims, 22 Drawing Sheets

(56) References Cited

OTHER PUBLICATIONS

Yao, Yagang, et al. "Large-scale production of two-dimensional nanosheets." Journal of Materials Chemistry 22.27 (2012): 13494-13499.*

Zhao, Weifeng, et al. "Preparation of graphene by exfoliation of graphite using wet ball milling." Journal of materials chemistry 20.28 (2010): 5817-5819.*

Aparna, R., et al. "An effective route to produce few-layer graphene using combinatorial ball milling and strong aqueous exfoliants." Journal of Renewable and Sustainable Energy 5.3 (2013): 033123.*

Khan, U.; Porwal, H.; O'Neill, A.; Nawaz, K.; May, P.; Coleman, J.N., Solvent-Exfoliated Graphene at Extremely High Concentration. Langmuir 2011, 27 (15), 9077-9082.

Barwich, S.; Khan, U.; Coleman, J.N., A Technique to Pretreat Graphite Which Allows the Rapid Dispersion of Defect-Free Graphene in Solvents at High Concentration. The Journal of Physical Chemistry C 2013, 117 (37dsa). 19212-19218.

* cited by examiner

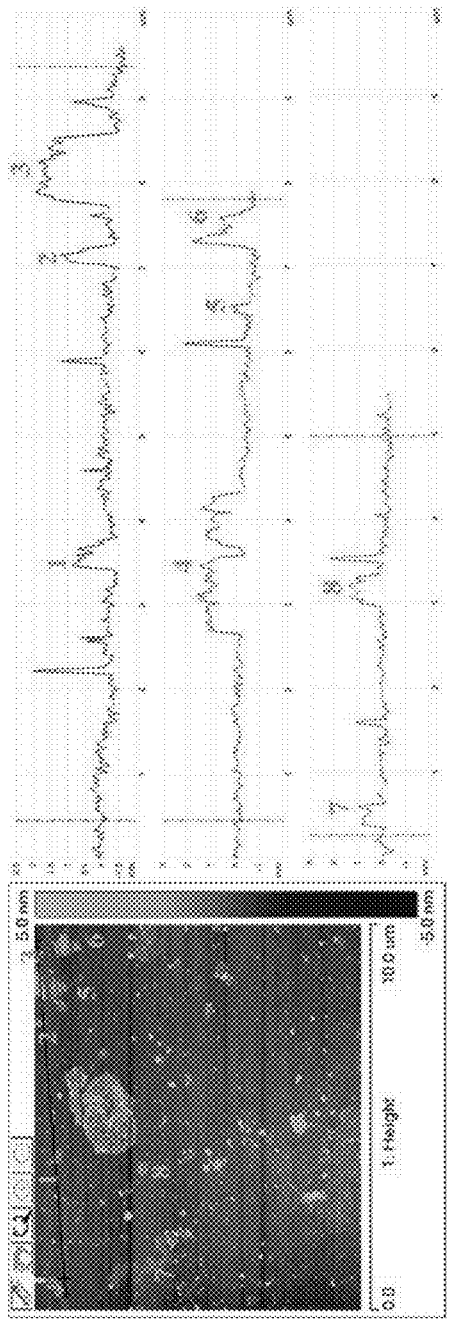
FIG. 7A
FIG. 7B
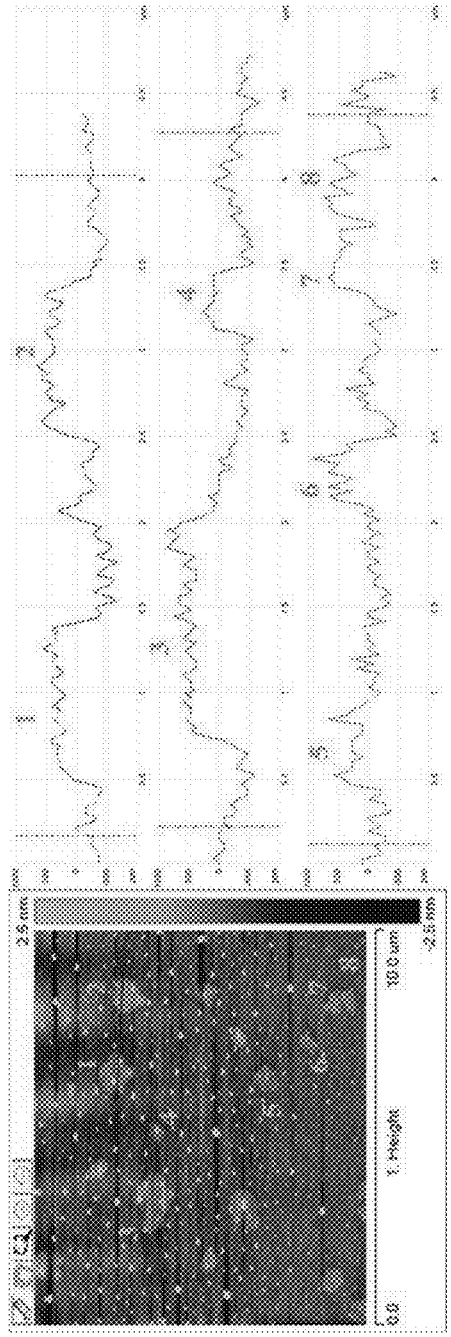
FIG. 7C
FIG. 7D

FIG. 9A
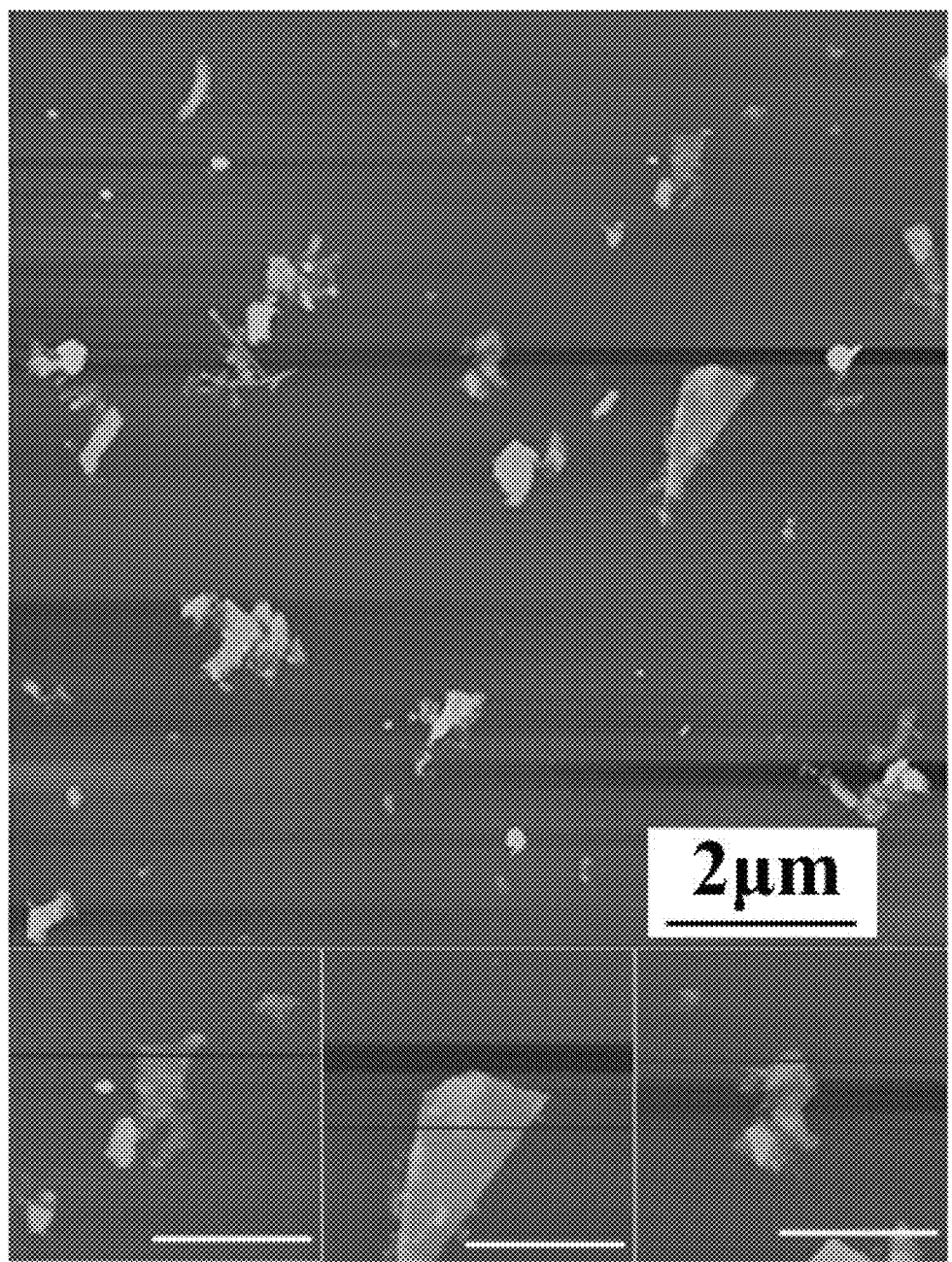
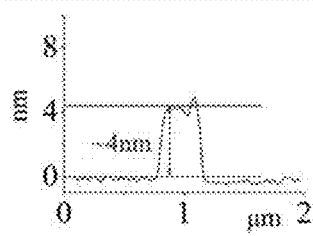 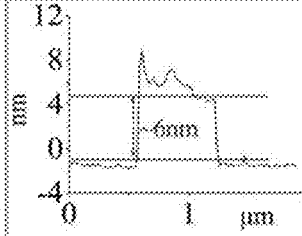 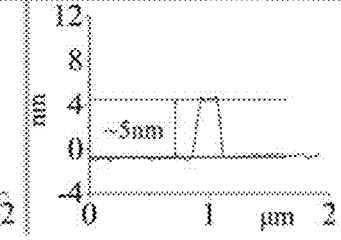
FIG. 9B  FIG. 9C  FIG. 9D

FIG. 12A
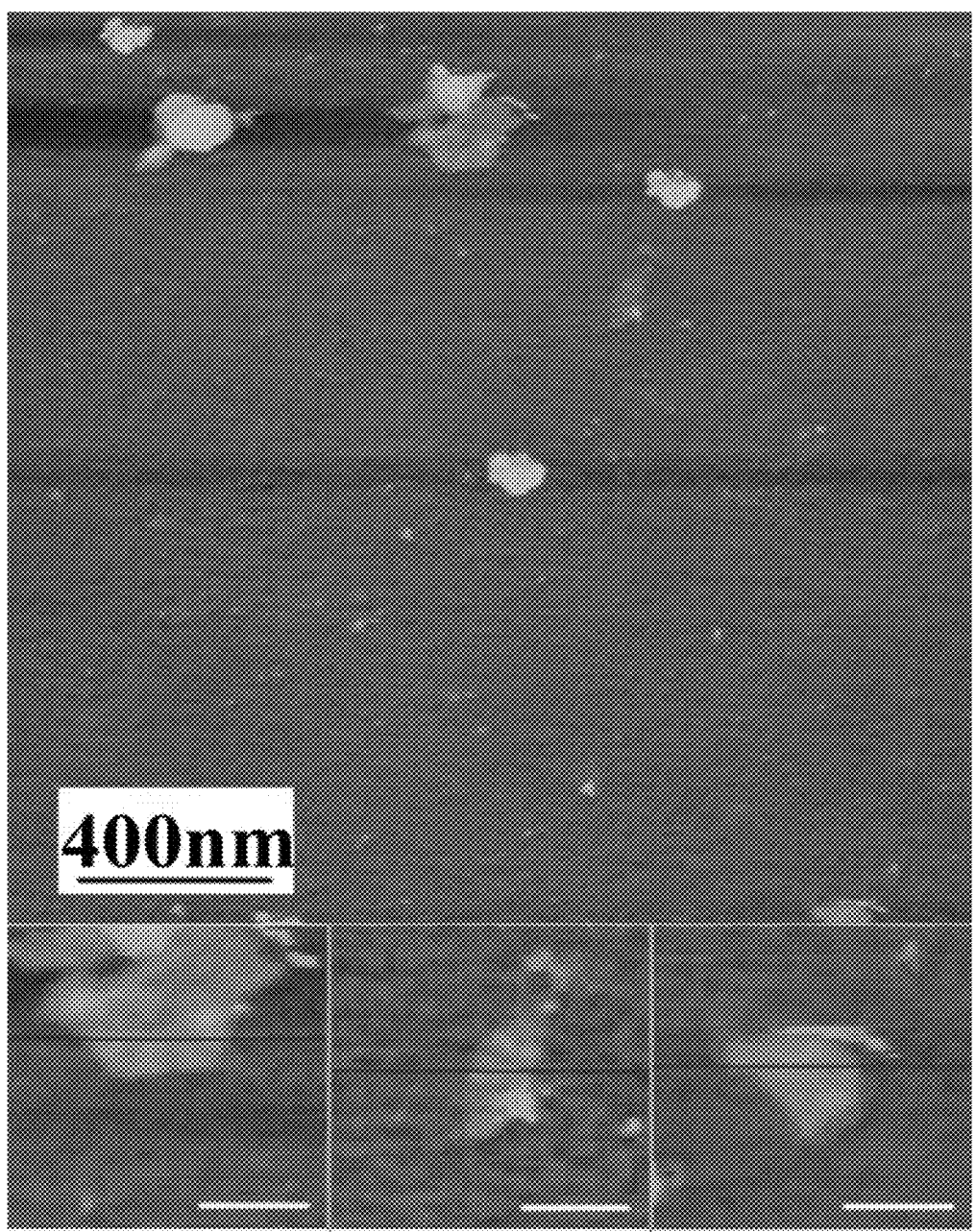
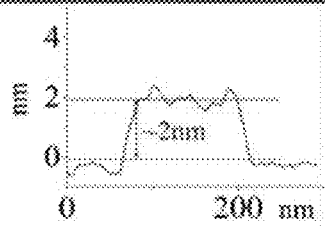
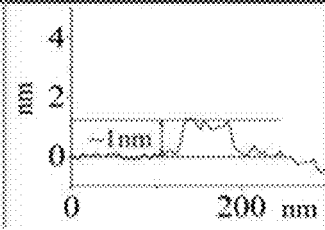
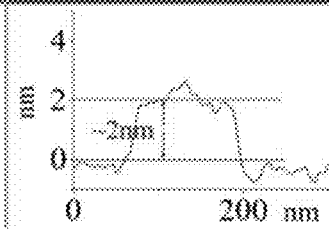
FIG. 12B     FIG. 12C     FIG. 12D

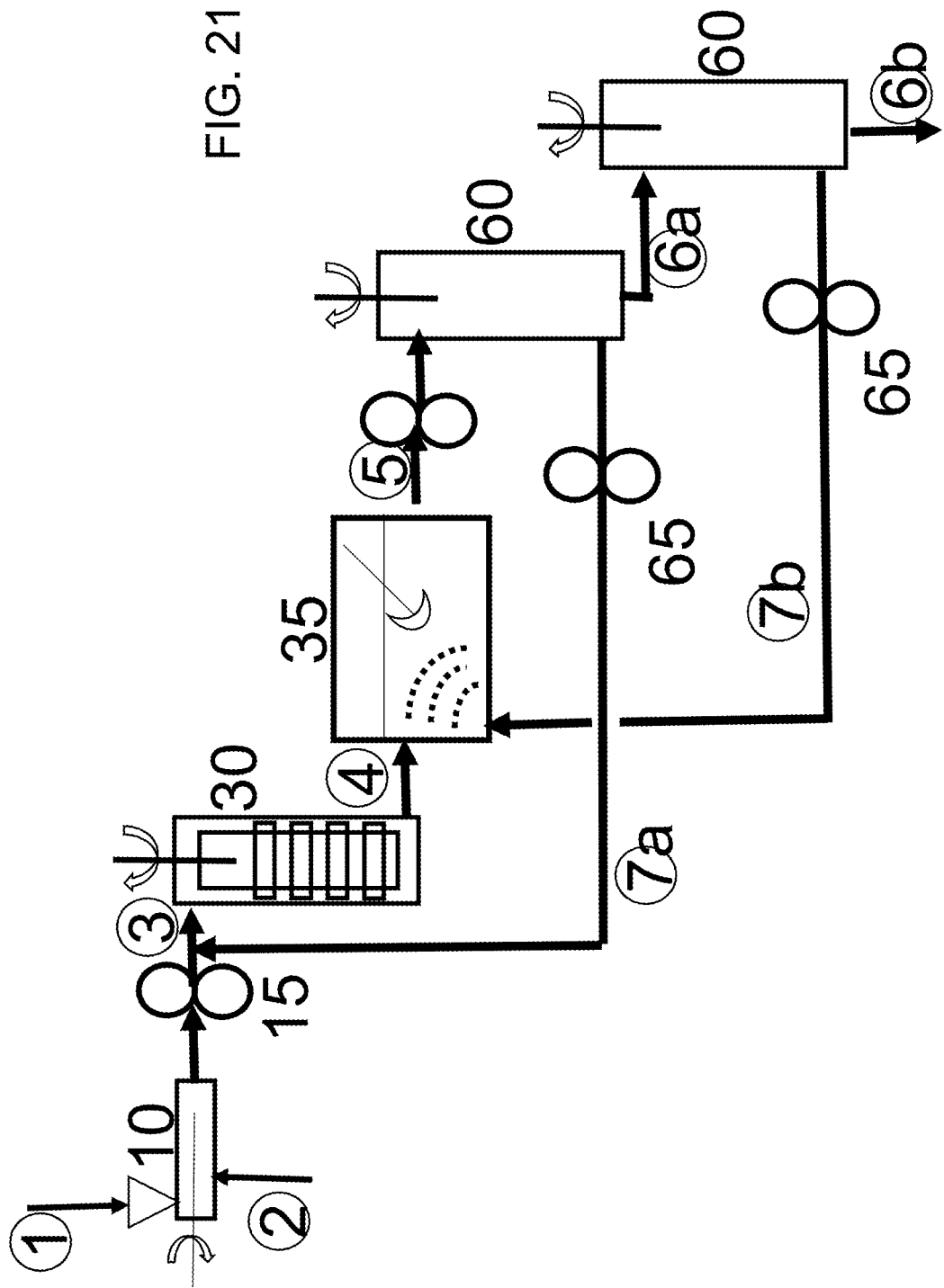

FAST PRODUCTION OF HIGH QUALITY GRAPHENE BY LIQUID PHASE EXFOLIATION

CROSS-REFERENCE TO RELATED APPLICATIONS

This application claims priority to and the benefit of U.S. provisional patent application Ser. No. 62/258,770, filed Nov. 23, 2015, which application is incorporated herein by reference in its entirety.

STATEMENT REGARDING FEDERALLY FUNDED RESEARCH OR DEVELOPMENT

This invention was made with government support under grant CMMI-1334460 awarded by NSF. The government has certain rights in the invention.

FIELD OF THE INVENTION

The invention relates to preparation of materials in general and particularly to a method of production of graphene.

BACKGROUND OF THE INVENTION

Graphene sheets (GS), sp2-hybridized, two-dimensional (2D) carbon monolayers, are attracting intense interest owing to their inherent exciting physical and electronic properties. Graphene flakes is another term used for graphene sheets, and both terms are used alternatingly in this application.

Various methods of making such materials including exfoliating graphite by applying sonication, cracking, milling, and grinding are known in the art.

Direct exfoliation of graphite particles has the potential of becoming the most economical manufacturing method for producing large quantities of single layer graphene. However, the tight interlayer spacing of graphite and strong cohesive forces between the layers make direct exfoliation of graphite extremely difficult. Mechanical exfoliation either through shear forces or through sonication has only met limited success.

Graphene sheets can be produced through the exfoliation of graphite, a widespread mineral in nature, by mechanical cleavage, ball-milling, or direct exfoliation in liquids. Liquid-exfoliation of graphite through the sonication of graphite suspensions in specific liquid environment, such as Dimethylformamide (DMF), N-methyl-2-pyrrolidone (NMP) has been attracting widespread interest since it was firstly reported by Coleman et al. in 2008, for its simplicity and cost-effectiveness. See for example, Hernandez, Y.; Nicolosi, V.; Lotya, M.; Blighe, F. M.; Sun, Z.; De, S.; McGovern, I. T.; Holland, B.; Byrne, M.; Gun'Ko, Y. K.; Boland, J. J.; Niraj, P.; Duesberg, G.; Krishnamurthy, S.; Goodhue, R.; Hutchison, J.; Scardaci, V.; Ferrari, A. C.; Coleman, J. N., High-yield production of graphene by liquid-phase exfoliation of graphite. Nat Nano 2008, 3 (9), 563-568; Khan, U.; Porwal, H.; O'Neill, A.; Nawaz, K.; May, P.; Coleman, J. N., Solvent-Exfoliated Graphene at Extremely High Concentration. Langmuir 2011, 27 (15), 9077-9082; and Barwich, S.; Khan, U.; Coleman, J. N., A Technique To Pretreat Graphite Which Allows the Rapid Dispersion of Defect-Free Graphene in Solvents at High Concentration. The Journal of Physical Chemistry C 2013, 117 (37dsa), 19212-19218.

However, it is found that the affinity of such solvent molecules to graphene is too weak to overcome the strong van der Waals force between the π-π stacked layers of graphite. As a result, the liquid exfoliation process is superficial and slow. Graphite surface roughening and exfoliation were achieved only after hours of sonication. Other exciting advances suggest that shear should be used for liquid exfoliation of graphite into graphene. Nevertheless, these methods still encounter one major challenge: their relatively low efficiency. Typically, ~0.1 mg/ml of graphene could be produced after having applied hundreds of hours of bath-sonication or hours of shear (if applying relatively rigorous centrifugation (>1,000 g) to remove the un-exfoliated large flakes). Exfoliating graphite in water/surfactant, polymer solution and ionic liquids were also reported as promising approaches, but washing-off the residual molecules from graphene flakes was necessary after the exfoliation step to alleviate negative impact on the electrical and mechanical performances of GS-based devices by such molecules.

Also known in the prior art is Chang et al., U.S. Pat. No. 9,327,984 B2, issued May 3, 2016, which is said to disclose a method for preparing graphene nanoplate (GNP) that includes preparing expanded graphite (EG) and exfoliating, grinding, or cracking the expanded graphite to crack the EG induced by gas-phase-collision. A graphene nanoplate paste and a conductive coating layer formed of the graphene nanoplate paste are provided and are prepared by the method for preparing graphene nanoplate.

There is a need for improved processes for producing graphene material.

SUMMARY OF THE INVENTION

According to one aspect, the invention features a sequential process for exfoliation of graphite to produce graphene flakes with a thickness of one to three graphene layers, comprising the steps of (a) creating a first suspension of a graphitic material in a first liquid; (b) treating the first suspension in a flow treatment; (c) centrifuging the first suspension created in step (b) to create a supernatant and a sediment; (d) separating of the supernatant from the sediment; (e) dispersing the sediment in a second liquid to create a second suspension; (f) sonicating the second suspension that resulted from step (e); (g) centrifuging the second suspension that resulted from step (f); (h) separating the second suspension into a second supernatant and a second sediment; (i) recovering at least one graphene flake having a thickness of one to three graphene layers from the supernatant; and (j) dispersing said sediment in a third liquid to create a suspension for recirculation.

In one embodiment, the graphitic material is pristine graphite.

In another embodiment, the liquid used in step (a) is N-methyl pyrolidone.

In yet another embodiment, the liquid used in step (d) is N-methyl pyrolidone.

In still another embodiment, the liquid used in step (a) or in step (d) comprises N-methyl pyrolidone.

In a further embodiment, step (e) involves the use of pebbles.

In yet a further embodiment, the graphitic material is modified to comprise at least one of a bent edge and a bent corner.

In another embodiment, either centrifuging step is performed in a solid bowl centrifuge.

In another embodiment, the sequential process further comprises the step of adding fluid to the suspension of unexfoliated graphite from the centrifuge before pumping it into the step of sonication.

According to another aspect, the invention relates to a sequential process for exfoliation of graphite to produce graphene flakes with a thickness of one to three graphene layers, comprising the steps of: (a) creating a first suspension of a graphitic material in a first liquid; (b) treating the first suspension in a flow treatment; (c) sonicating the suspension that resulted from step (b); (d) centrifuging the suspension that resulted from step (c); (e) separating the suspension into a supernatant and a sediment; and (f) recovering at least one graphene flake having a thickness of one to three graphene layers from the sediment; and (g) dispersing said sediment in a third liquid to create a suspension for recirculation.

In one embodiment, the graphitic material is pristine graphite.

In another embodiment, the liquid used in step (a) or in step (c) comprises N-methyl pyrolidone.

In yet another embodiment, step (e) involves the use of pebbles.

In still another embodiment, the graphitic material is modified to comprise at least one of a bent edge and a bent corner.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 7A is a 2 dimensional AFM height image of ChF-Sonication produced graphene flakes deposited on Si substrate.

FIG. 7B is a graph showing height profile analysis across several flakes shown in FIG. 7A.

FIG. 7C is another 2 dimensional AFM height image of ChF-Sonication produced graphene flakes deposited on Si substrate.

FIG. 7D is a graph showing height profile analysis across several flakes shown in FIG. 7C.

FIG. 9A is a 2 dimensional AFM height image of graphene flakes generated by direct sonication of pristine graphite.

FIG. 9B, FIG. 9C, and FIG. 9D are three zoomed-in images of three individual flakes (scale bar represents 1 μm) that appear on FIG. 9A. Below each of the images is the corresponding height profile taken along the marked horizontal line.

FIG. 12A is a 2 dimensional AFM height image of graphene flakes generated by chaotic flow.

FIG. 12B, FIG. 12C, and FIG. 12D are three zoomed-in 2 dimensional AFM height images of three individual flakes (scale bar represents 100 nm). Below each of the images is the corresponding height profile taken along the marked horizontal line.

FIG. 21 schematically illustrates features of a continuous graphene process using two centrifuges.

DETAILED DESCRIPTION

The present invention uses an improved method of exfoliation of graphite in a sample comprising the graphite and a solvent in which stabilized zirconium oxide rods (95% $ZrO_2$, 5% $Y_2O_3$) are present. The stabilized zirconium oxide rods are also referred to as "pebbles." The sample of solvent, graphite and stabilized zirconium oxide rods are manipulated in a mixing apparatus, such as the DAC 150.1 FV mixer available from FlackTek Inc., 1708 Highway 11, Building G, Landrum, S.C. 29356.

In one embodiment, the sample size was about 20 ml.

In one embodiment, the stabilized zirconium oxide rods were cylinders which are 9.6 mm in height and 9.7 mm in diameter.

In one embodiment, the mixing cup used was 40 mm in diameter and 26.5 mm in height.

The flow treatment of the present invention is much more benign than the conventional grinding used in prior art exfoliation processes. Benign treatment is desirable for maintaining large lateral size of the graphene flakes at the end of the exfoliation process.

Figure 1:
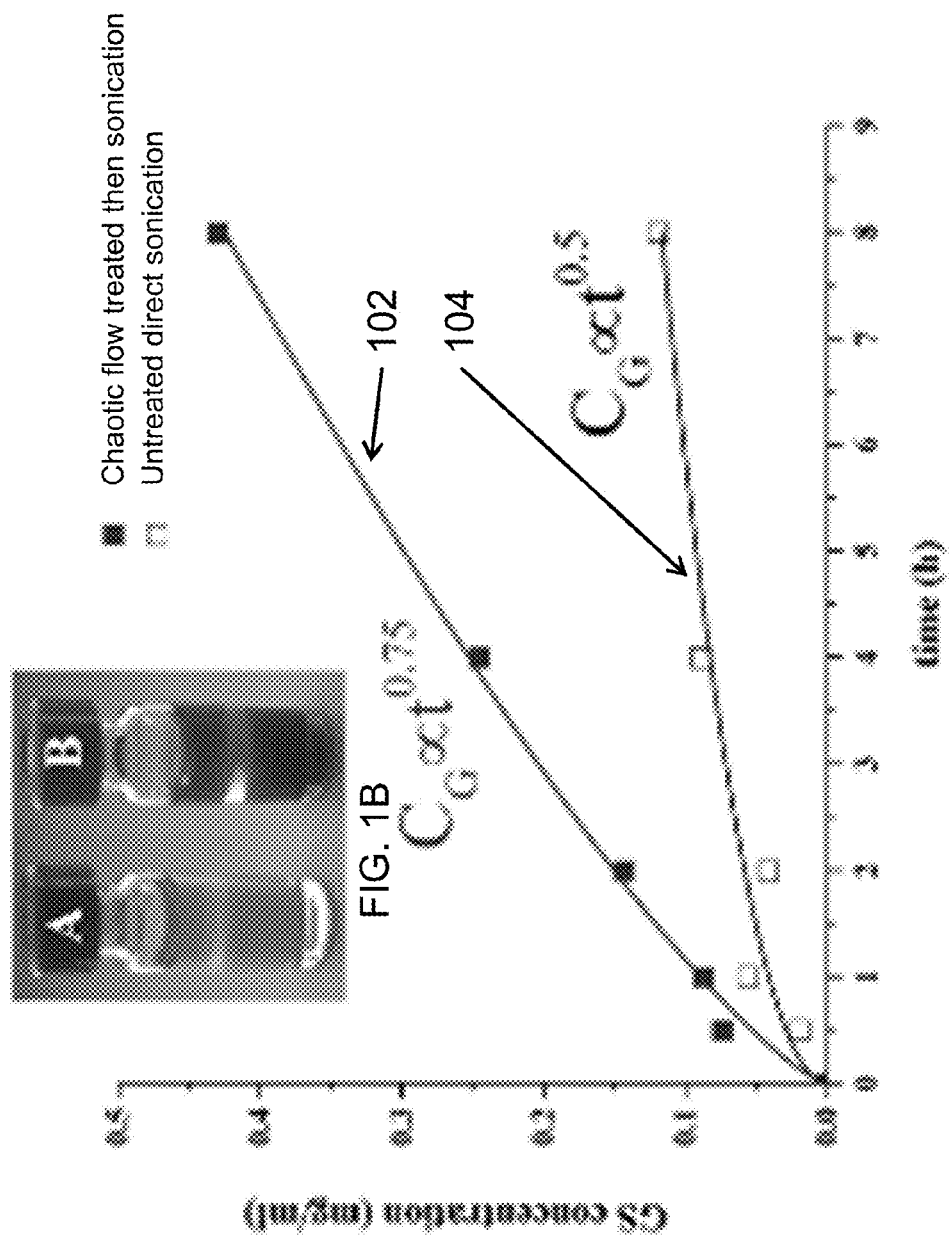
FIG. 1A is a graph illustrating the correlation between graphene concentration ($C_G$) and sonication time (t).
FIG. 1B is an image that demonstrates the Tyndall effect generated by grapheme colloids produced via direct 0.5 h sonication (Vial A) and novel ChF-pretreatment followed by 0.5 h sonication (Vial B).

FIG. 1 of the document entitled "A roadmap for graphene" illustrates, and the document describes, some of the expected applications that can be accomplished using graphene produced by exfoliation.

In particular the document teaches that liquid phase exfoliation produces such graphene coatings without the use of expensive vacuum technology. Although the resistance of these films is on the high side, they still perform well enough for smart windows, solar cells and some touch screen applications. Graphene has the important advantage of flexibility and mechanical strength, which ensures that graphene-based devices will probably dominate flexible applications.

The present invention provides a method and apparatus for production of graphene flakes at substantially increased yield. The described sonication experiments on graphite suspensions show that quadrupled graphene yield can be achieved through introducing flow pre-treatment of the graphite before sonication.

We describe a novel and efficient approach for liquid exfoliation of graphite into GS. NMP was chosen as the solvent since its widely-reported effectiveness in graphite exfoliation by sonication. The graphite/NMP suspensions were firstly placed in a chaotic flow (ChF) with rapid liquid stream dividing around and recombining between cylindrical pebbles, which causes fierce inter-particle and particle-pebble collisions. As a result, the graphite particles become "dog-eared", i.e. the edges of the crystals were curled-up. Moreover, these edge irregularities ("dog-ears") in the graphite particles seem to act as weak points, which help solvent molecules to "wedge" in between layers during the subsequent sonication process, thus leading to significantly improved exfoliation efficiency as shown in FIG. 1A and FIG. 1B.

FIG. 1A is a graph illustrating the correlation between graphene concentration ($C_G$) and sonication time (t). Curve 102 illustrates a novel process with chaotic flow pre-treated graphite followed by sonication. Curve 104 illustrates a direct sonication process of pristine graphite. The concentration of the supernatant, $C_G$, was determined by UV-Vis spectra following the Lambert-Beer law ($A=\alpha \cdot C_G \cdot l$, using the well-established absorption coefficient $\alpha=3620$ ml $mg^{-1}$ $m^{-1}$).

FIG. 1B is an image that demonstrates the Tyndall effect generated by graphene colloids produced via direct 0.5 h sonication (Vial A) and novel ChF-pretreatment followed by 0.5 h sonication (Vial B). Rigorous centrifugation (RCF≈1400 g) was used to separate the un-exfoliated flakes.

In one embodiment, dispersions of graphite in NMP in a concentration of 6 mg/ml was firstly subjected to a chaotic flow (ChF) for 2 min, which was induced by a dual-asymmetric mixing system (illustrated in SI-FIG. 1, detailed description of the apparatus and experimental conditions are provided in the Supporting Information (SI)). Then the suspension was centrifuged at 4000 rpm for 30 min (RCF≈1400 g, all centrifugation was carried out under these conditions hereafter). The top-80% supernatant (ChF-SP), which already contained some amount of graphene (≈0.034 mg/ml as described later), was removed by a pipette and the sediment (ChF-SD) was collected for further processing by sonication.

Figure 6:
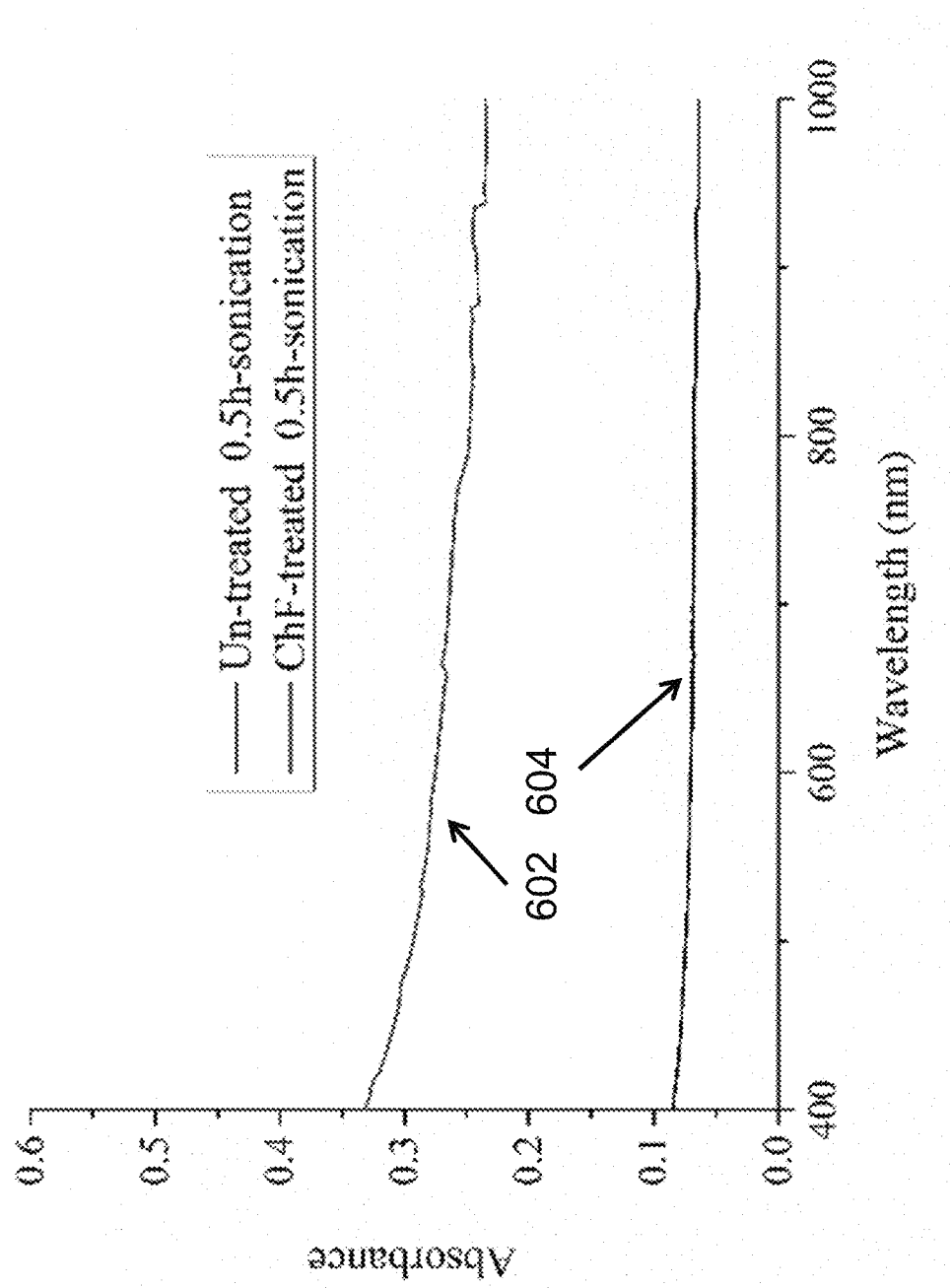
FIG. 6 is a diagram showing the representative UV-vis absorbance curves of the GS/NMP colloid. Curve 602 is for the chaotic-flow pre-treatment followed by 0.5 h sonication. Curve 604 is for direct sonication of the graphite/NMP suspension. Note that both colloids were all diluted 10 times in volume.
Figures 8A, 8B, 8C, 8D:
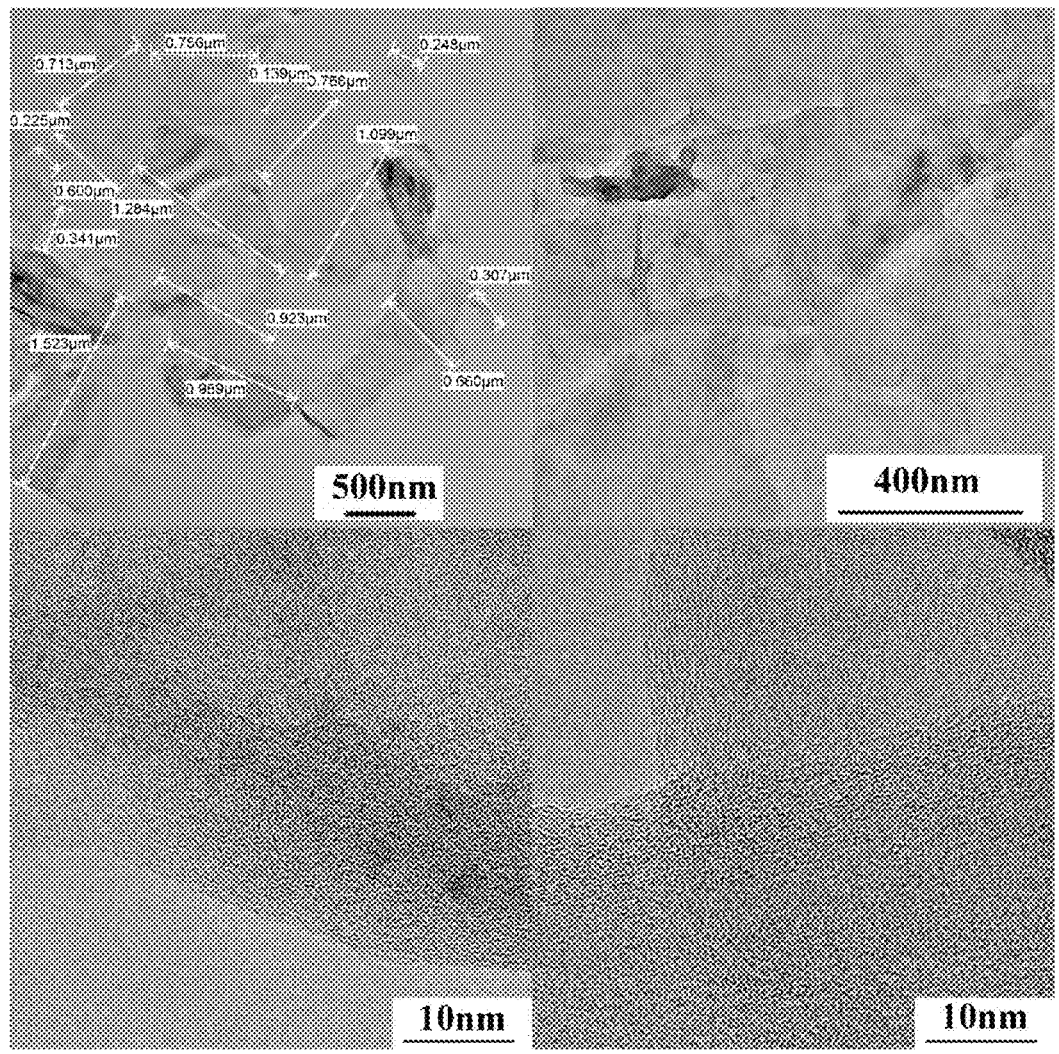
FIG. 8A and FIG. 8B are TEM images of ChF-Sonication produced graphene flakes deposited on Si substrate.
FIG. 8C and FIG. 8D are HRTEM images of ChF-Sonication produced graphene flakes deposited on Si substrate.
Figures 10A, 10B:
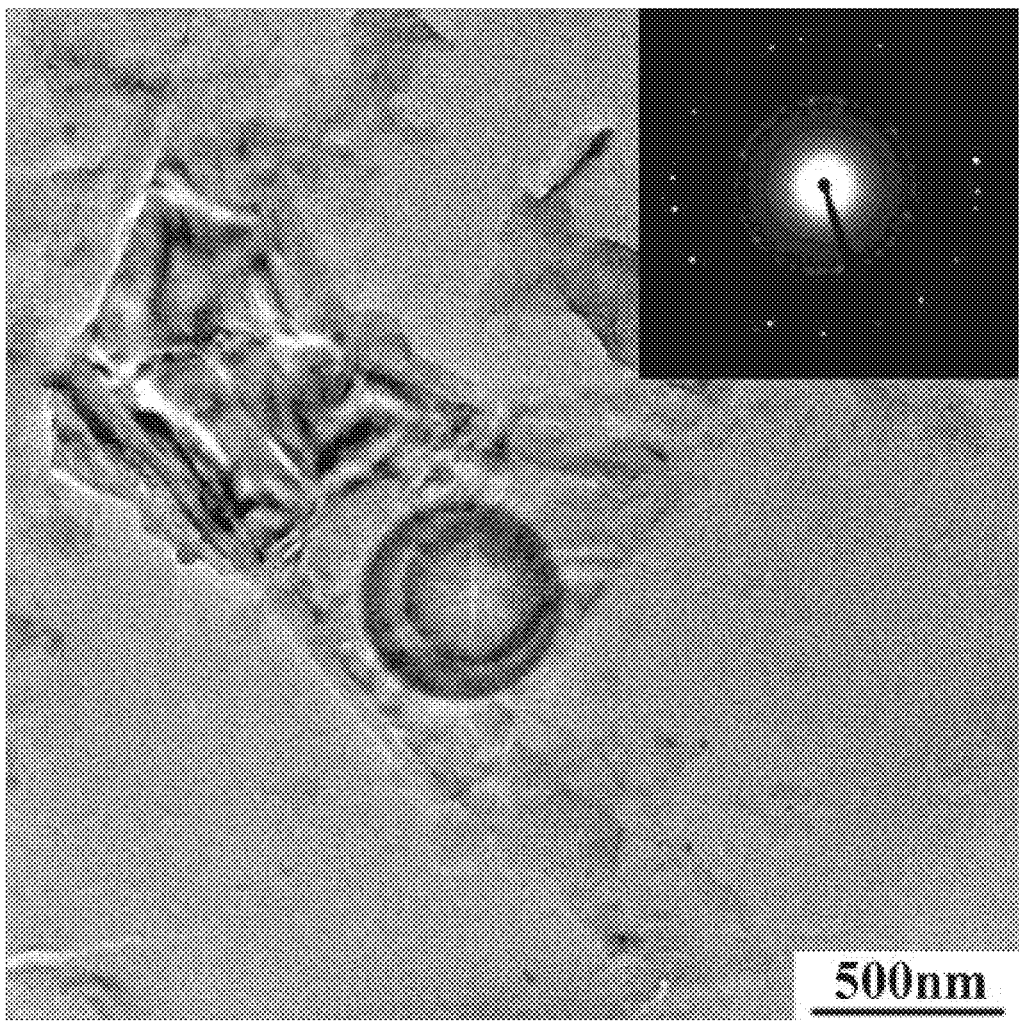
FIG. 10A is a TEM image of a graphene flake generated by direct sonication of pristine graphite.
FIG. 10B is a SAED pattern of the black circle area in the image of FIG. 10A.

To continue with the second part of the exfoliation process, the chaotic flow sediment (ChF-SD) was re-dispersed in NMP (volume equal to original graphite NMP suspension volume) to form a graphite suspension. Sonication times of 0.5-8 hours were applied to the re-dispersed suspensions to achieve further exfoliation. Using the centrifuge to remove the un-exfoliated particles, the top 80% supernatant was collected for further characterization by UV-vis spectra, which appeared flat and featureless through 400-1000 nm wavelength range as shown in FIG. 6. The concentration of GS was determined by the Lamber-Beer law ($A/l=\alpha C_G$), using the well-established absorption coefficient $\alpha=3620$ ml/mg·ml at 660 nm). The calculated concentration is shown in FIG. 1A, curve 102. The ChF-treated sample exhibits high time-efficiency for exfoliation with a graphene sheet (GS) concentration-time correlation of $C_G \propto t^{0.75}$. After 8 hours of sonication, the GS concentration reached 0.430 mg/ml, which is comparable to graphene oxide (GO) exfoliation in organic solvents.[15]

For comparison, the pristine graphite suspensions with the same graphite concentration were sonicated for various times without any pre-treatment. After centrifugation, the supernatant and residual sediment were collected. The colloidal supernatants were characterized as above and the calculated concentration is shown in FIG. 1A, curve 104. The direct sonication induced exfoliation of graphite exhibits $C_G \propto t^{0.5}$ correlation, suggesting a flake-size-controlled concentration evolution, which is in good agreement with previously reported results.

FIG. 1A demonstrates that the flow pre-treatment greatly enhances the graphene yield. For instance, after 0.5 hour of sonication, the concentration of graphene increased from 0.019 mg/ml in the case of untreated graphite suspension to 0.074 mg/ml in the ChF-treated graphite suspension. The untreated graphite suspension yielded only 0.119 mg/ml GS colloid after sonication for the same period of time (8 h) while the flow-treated graphite had reached 0.430 mg/ml.

After ChF-sonication treatment and purified by centrifuging, diluted supernatant was spin-coated on a silicon substrate and dried carefully. We characterized the flakes' size and thickness using atomic force microscopy (AFM) and by transmission electron microscopy (TEM).

Figure 2:
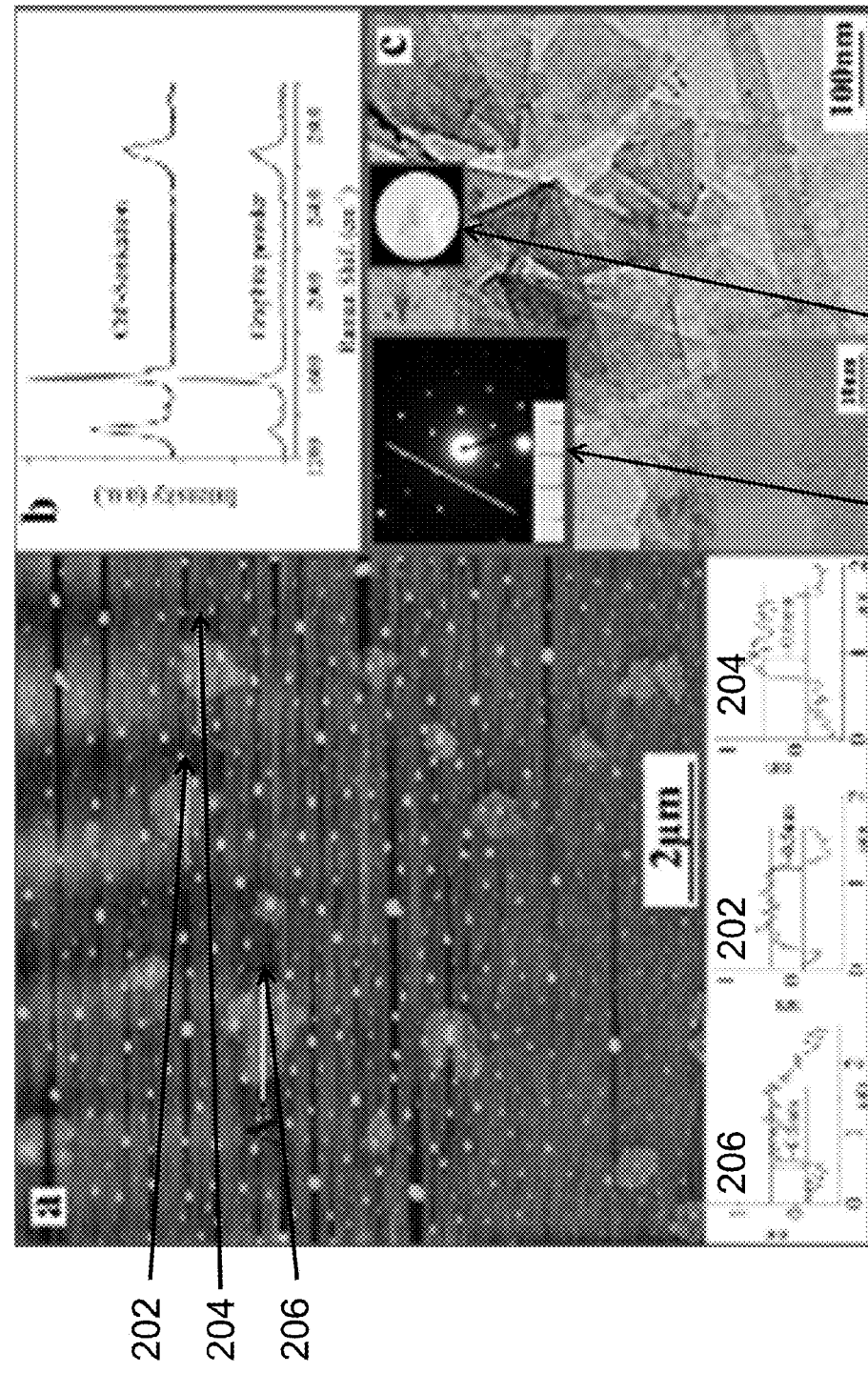
FIG. 2A is an AFM height image of graphene flakes produced via ChF-sonication (8 h) and deposited on silicon, with detailed measurements at locations 202, 204 and 206 shown on FIG. 2F.
FIG. 2B is a diagram showing Raman spectra of the starting graphite powder and produced graphene flakes.
FIG. 2C is a TEM image of the exfoliated graphene.
FIG. 2D is a selected area electron diffraction (SAED) pattern.
FIG. 2E is a high resolution TEM image on the edges of the GS.
FIG. 2F is a series of graphs illustrating the height profiles at three locations 202, 204, 206, which are marked on FIG. 2A.

FIG. 2A is an AFM image over a 10 μm×10 μm area depicting a large number of flakes with sub-micrometer lateral size, similar to those flakes observed by transmission electron microscopy (TEM) (FIG. 2C). Along with tens of nanometer sized graphene "nanodots", the produced flakes exhibited apparent thickness ranging from 0.5~1.8 nm as measured by AFM (additional AFM image and corresponding height analysis provided in FIG. 7). We believe that this thickness should be considered as <3 graphene layers. Several literature reports show that the apparent height of GS monolayers measured by tapping-mode AFM ranged from 0.4 to 1 nm.

FIG. 2B is a diagram showing Raman spectra of the starting graphite powder and produced graphene flakes. Raman spectroscopy of such GS's thin film also suggests these flakes to be less than 5 layers thick. The lateral size of the spectrometer's laser beam was ~1 μm.

FIG. 2C is a TEM image of the exfoliated graphene. High resolution TEM (HR-TEM) bright field image on the flake edges displayed the edges of a single-layer graphene.

FIG. 2D is a selected area electron diffraction (SAED) pattern. Hexagonal electron diffraction (ED) pattern was collected when focusing the e-beam to an individual flake, which exhibits characteristics of single-layer graphene that features a typical plot of a line section through (1-210)-(0-110)-(-1010)-(2110) diffraction dots.

FIG. 2E is a high resolution TEM image on the edges of the GS.

FIG. 2F is a series of graphs illustrating the height profiles at three locations 202, 204, 206.

The lateral size of the graphene flakes were estimated to be ~1 μm based on AFM and TEM imaging, in average. Additional TEM images and statistical estimation are shown in FIG. 8A through FIG. 8D. For comparison, the GS flakes exfoliated by direct sonication of graphite suspensions were also characterized by AFM, TEM, and SAED (See FIG. 9A-FIG. 9D and FIG. 10A and FIG. 10B), following the same sample preparation protocol. The GS produced by direct sonication of graphite suspension exhibits thicknesses of several nanometers and an average lateral size of approximately 1 μm, consistent with numerous earlier publications. Thus, the GS produced from pre-treated graphite suspensions are few-layered with lateral size in hundreds of nanometers, relatively less thick and comparable in lateral size compared to our control group (direct sonication).

To understand the cause for the significantly heightened sensitivity of the ChF-treated graphite to ultrasound, we took graphite sediment from both direct sonication (no flow) and just ChF-treatment (no sonication) and looked for structural differences.

Figure 3:
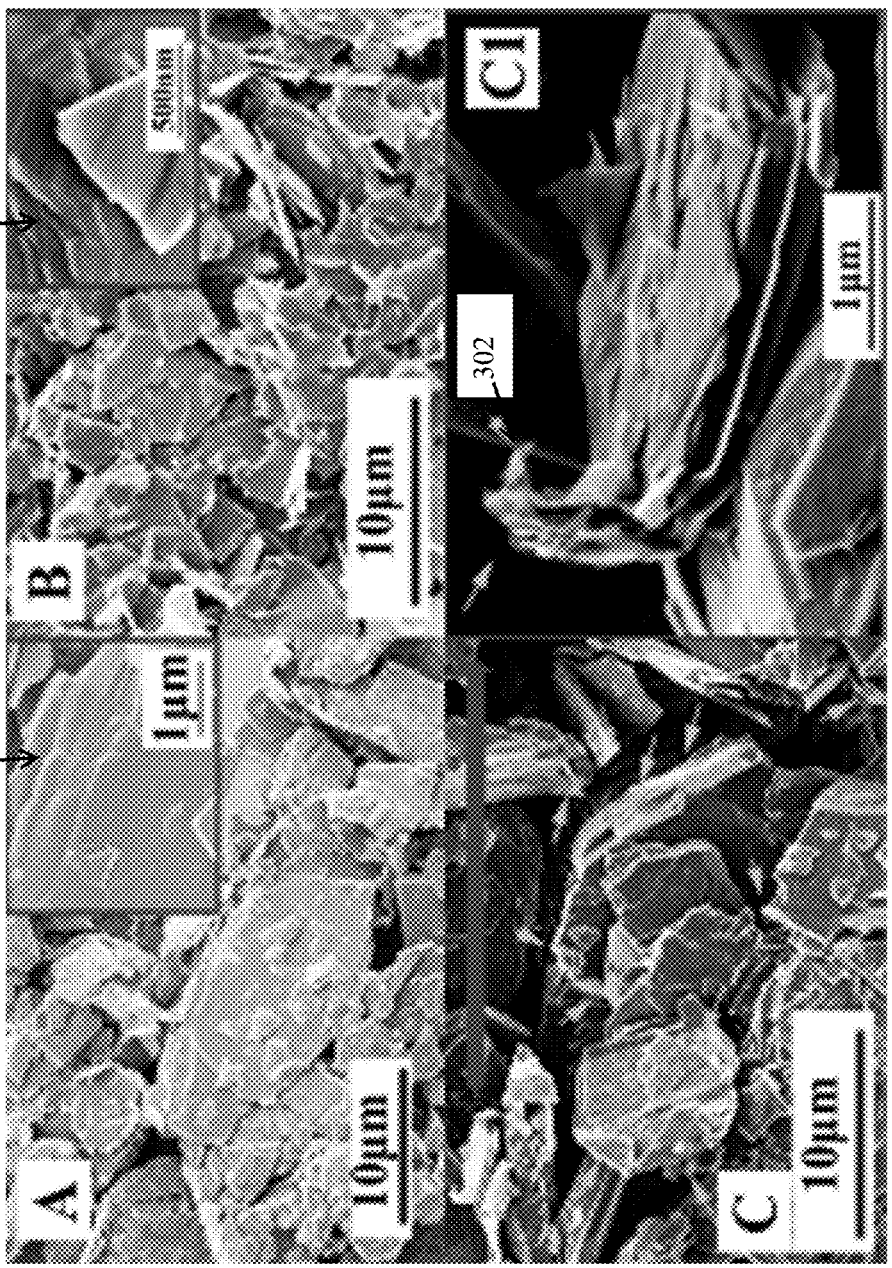
FIG. 3A is an SEM image of pristine graphite.
FIG. 3B is a close up SEM image of a pristine graphite.
FIG. 3C is an SEM image of sediment after 4 h sonication.
FIG. 3D is a close up SEM image of sediment after 4 h sonication.
FIG. 3E is an SEM image of sediment produced after 2 min of chaotic flow processing.
FIG. 3F is a close up SEM image of sediment produced after 2 min of chaotic flow processing in which a particle may be seen with a "dog-ear" 302 in the upper left corner of the image.

FIG. 3A is an SEM image of pristine graphite. The reference state is the pristine graphite used in this study. Due to the strong inter-layer π-π interaction in the pristine graphite, the wetting and wedging process of NMP molecules was expected to be relatively slow and inefficient.

FIG. 3B is a close up SEM image of a pristine graphite.

FIG. 3C is an SEM image of sediment after 4 h sonication. After sonication only, the edges of graphite remained straight and intact, and flat terraces similar to the ones observed in the pristine graphite were also observed, which indicate that the sonication-induced exfoliation started at the (002) surface of the crystal. As can be seen in FIG. 3C, after 4 hours of sonication the graphite particles were broken down from ~20 microns of pristine graphite to several microns.

FIG. 3D is a close up SEM image of sediment after 4 h sonication.

FIG. 3E is an SEM image of sediment produced after 2 min of chaotic flow processing. In comparison, after 2 min of chaotic flow treatment of the graphite suspension, the edges of graphite particles started to curl-up forming a "dog-ear" morphology. We note the graphite particle lateral size in the (002) plane direction remained over 10 microns, which is desirable for producing large flakes, while the thickness of the crystal stacks were reduced by ChF.

FIG. 3F is a close up SEM image of sediment produced after 2 min of chaotic flow processing in which a particle may be seen with a "dog-ear" 302 in the upper left corner of the image. The chaotic flow, through causing intensive collision to the suspended graphite, delaminated graphite stacks and possibly left confined NMP molecules in between layers as indicated by a broadened and declined (002) XRD peak of the treated suspension shown in SI-FIG. 7.

We also noticed that there were few-layered GS flakes in relatively low concentration existing in ChF-SP (as shown in FIG. 9A-FIG. 9D). Moreover, the concentration of GS in the supernatant increases if we prolong the chaotic flow time (See FIG. 13). We propose two potential mechanisms that may cause these phenomena: (i) it could be due to the shearing of the suspension, probably while flowing around the pebbles, as shear in a liquid environment was recently reported as another approach to achieve exfoliation of graphite,[1] or (ii) it could be that collision-induced "dog-ears" came off from graphite substrate and dispersed in NMP as exfoliated flakes. The chaotic flow was stopped after a relatively short time (2 min) in order to preserve the integrity of the main part of the graphite crystals. And, even though higher yield of GS could be achieved if we directly sonicate the post flow-treatment suspension (kept the ChF-SP without centrifuging, pipetting and re-dispersing), in this study, in order to investigate the influence of the graphite's edge morphology and its influence on the sensitivity to sonication, we removed the ChF-SP and characterized it separately after separation by centrifugation.

Figure 4:
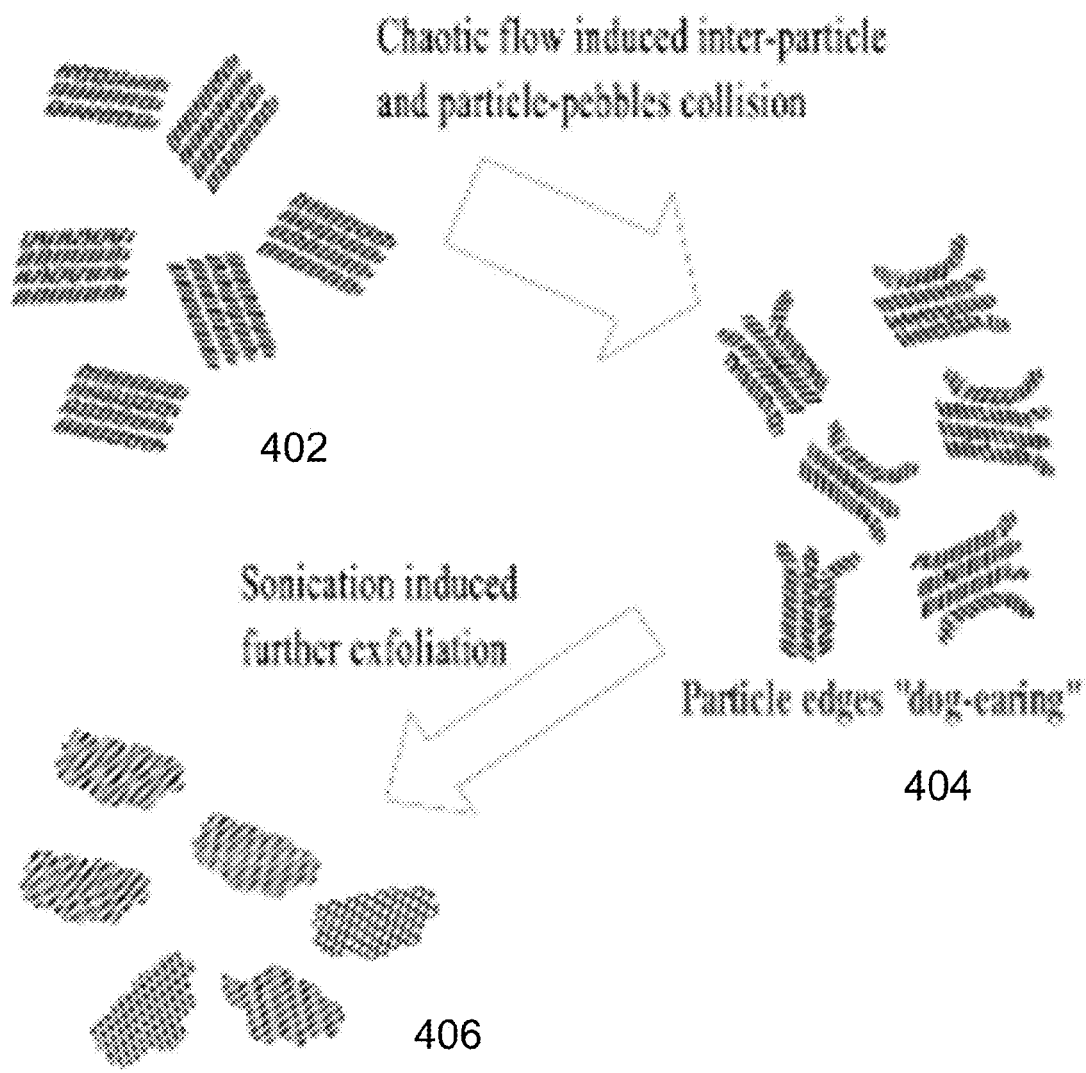
FIG. 4 is a flow diagram illustrating the process by which pristine graphite particles 402 are processed with chaotic-flow induced collisions to produce "dog-eared" particles 404 and then further processed by sonication to produce exfoliated graphene sheets 406.

FIG. 4 is a flow diagram illustrating the process by which pristine graphite particles 402 are processed with chaotic-flow induced collisions to produce "dog-eared" particles 404 and then further processed by sonication to produce exfoliated particles 406.

In summary, the sonication yield of graphene flakes has been significantly increased by pre-treating the graphite crystals with an intense mixing flow (chaotic flow for this study). Intensive inter-particle and particle-pebble collisions induced curled-up edges ("dog-ears"). The edge-modified graphite particles exhibit higher sensitivity to sonication in the liquid state, which leads to faster exfoliation of graphite and higher yield of graphene flakes. After a short time (0.5 h) of bath sonication, we observed a GS concentration of 0.074 mg/ml, which is extraordinarily time-efficient in liquid exfoliation of graphite (highest concentration for 0.5 h hour bath sonication). Moreover, pre-treated graphite suspensions produce GS flakes with substantially lower thickness (often down to <1 nm), close to monolayer graphene. We emphasize that via a ChaoticFlow-Sonication fast exfoliation sequence, the produced GS flakes are more likely to be free of topological defects, as the shortened duration of sonication avoids building up of bulk disorder. We also believe that the flow pre-treatment would lead to similar enhanced efficiency in other liquid environment such as water/surfactant, ionic liquid, polymer solution etc., since this flow pattern is universally achievable in liquid environment.

Materials and Methods

Graphite suspensions were prepared by adding natural graphite flakes (Asbury Graphite Mills, typical size ~20 μm) into N-Methyl-2-Pyrrolidone (NMP, biotechnology grade, Aldrich) at a concentration of 6 mg/ml at the volume of 20 ml.

Figure 5:
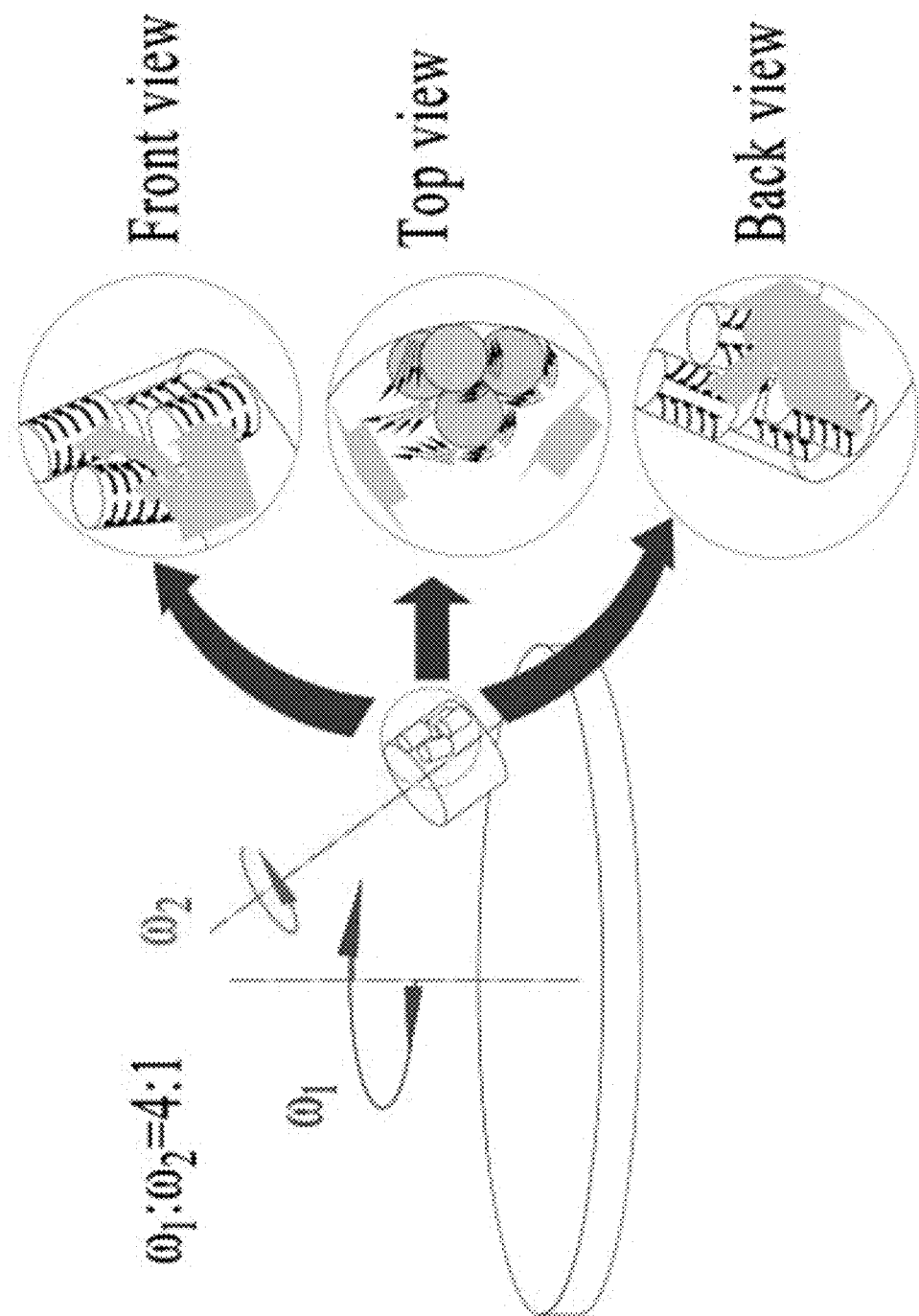
FIG. 5 is a schematic diagram of a chaotic flow apparatus for pre-treating the graphite suspension. The sample holders rotate around their inwards tilted axis with angular velocity $\omega_2$ during centrifugation around the main rotation axis with angular velocity $\omega_1$. Centrifugation with sample rotation induces a gravity-driven mixing flow. Solid pebbles, added into the sample containers, intensify the mixing by disrupting the gravity-driven flow.

Process of Chaotic Flow Pre-Treatment Followed with Sonication:

Suspensions were subjected to chaotic flow (ChF) in a dual-asymmetric mixing system (FlackTek, DAC150), which is a centrifuge but has, as its main feature, a tilted and rotating sample holder as shown in FIG. 5.

The sample holder rotation ($\omega_2$) is about ¼ of the main rotation ($\omega_1$). In this study the main rotation was set at 2000 rpm. Chaotic mixing is achieved by adding four cylindrical ceramic pebbles into the suspension. The pebbles obstruct the gravity induced flow of the circulating suspension and cause intensive stream dividing and recombining. The fluid gets compressed in the approach of a pebble and then divided by the pebble. When flowing around the pebble, the graphite suspension gets sheared near the pebble surface and suspended graphite particles collide with the solid wall. Behind the pebble, the fluid streams recombine and get stretched. This process of compression-dividing-shearing-recombining-stretching repeats many times but at different locations of the circulating suspension. After chaotic flow treatment (ChF), the suspensions were centrifuged (~1,400 g, 30 min, (Beckman JA20, 4000 rpm)) to remove the top 80% supernatant. The remaining sediment was re-dispersed to the original volume and sonicated using a bath sonicator (Branson 1510R-DTH bath sonication) for various sonication times. After centrifugation (same as above), the top-80% supernatant colloid were collected to obtain the final product.

Classical Process of Direct Sonication Exfoliation:

Another set of suspensions were sonicated directly (no flow treatment) in the same sonicator as above. Sonication time periods ranged from 0.5 h to 8 h. The sediment and the top-80% supernatant were separated by centrifuging at 1,400 g for 30 min. Both fractions were analyzed.

Characterization

UV-Vis-IR Spectra Characterization

A Shimadazu-3600 UV-vis-NIR spectrometer with 10 mm*10 mm cuvettes was used to determine the concentration of the graphene/NMP colloid. Colloids were first diluted by 10 times in volume to qualify for Lamber-Beer behavior ($A/l=\alpha C_G$). The well-known value of the absorption coefficient, $\alpha(660\ nm)=3620$ mL mg$^{-1}$ m$^{-1}$ was taken from the literature.

Atomic Force Microscopy (AFM)

A silicon substrate was prepared by first treating it with a piranha solution ($H_2SO_4:H_2O_2=3:1$ in volume) at 60° C. for 30 min, then rinsing it with water followed by drying in nitrogen. Onto the treated silicon substrate, a drop of highly-diluted graphene/NMP colloid was spin-coated and then dried in Nitrogen. AFM was carried out in a Nanoscope DI-3100 with silicon cantilevers operating in tapping mode.

Field Emission Scanning Electron Microscopy (FESEM)

Morphological changes in graphite crystals were imaged in a FEI Magellan-400 FESEM.

Graphite sediment was drop-cast on silicon and then dried in a vacuum oven at 200° C. for 24 h. 2 kV acceleration voltage and 13 mA current were chosen to observe the crystals without any gold-sputtering. Immersion lens were needed for high magnification observation.

Transmission Electron Microscopy (TEM)

Highly-diluted graphene/NMP colloidal suspension was drop-cast on copper grid with ultra-thin carbon film for bright field TEM observation. A FEI Tecani T12 and a JEOL JEM-2200FX Transmission Electron Microscopes were used to observe the exfoliated GS flakes with acceleration voltage at 120 kV and 200 kV, respectively. Electron Diffraction (ED) patterns were collected in JEM-2200 with a camera distance of 100 cm. Lacey carbon grids were used for HRTEM and ED experiments.

X-Ray Diffraction (XRD)

Panalytical X-Pert X-Ray Powder Diffractometer was used for XRD measurements with 1.54 nm wavelength X-ray, scanning angle from 5°-40°. 1 ml of untreated and ChF-treated graphite/NMP suspensions were cast on glass slides for suspension X-ray tests. 1 ml of Graphite/NMP suspension and ChF-sonication (4 h) produced graphene/NMP colloid were cast on glass then vacuum dried at 140° C. for 24 hour to remove solvent.

Raman Spectrum

The produced GS/NMP colloid was diluted 10 times, spin-coated on $SiO_2$ (200 nm $SiO_2$ on Silicon), and then washed with isopropanol to remove any residual NMP Samples were dried overnight in nitrogen in preparation for the Raman tests, which were performed in a DXR Raman Spectro-microscope (Thermo Scientific) with a 633 nm (beam size 1 μm) activation laser.

The UV-vis absorbance spectrums are flat and featureless, consistent with previous reports. The concentration of the supernatant, was determined by UV-Vis spectra following the LambertBeer law ($A=\alpha \cdot C_G \cdot l$, using the well-established absorption coefficient $\alpha=3620$ ml/(mg m).

The tapping mode AFM was used to determine the layer thickness and lateral size. Graphene colloid was highly diluted (~50 times by volume), and then deposited on Si-wafer. More than 30 flakes were observed (line-scans crossing 16 flakes were shown in FIG. S3) by AFM, which often exhibit thicknesses ranging from 0.5~1.8 nm. Herein, given that the apparent thickness of a single layer graphene was reported as ranging from 0.4 nm~1 nm and is dependent of the types and condition of cantilever, substrate and scanning parameter etc.[4-7], the apparent height profile indicates that flakes produced from ChF-Sonication sequence are often ≤3 layers, with lateral size of hundreds of nanometers.

The lateral size of ChF-Sonication produced flakes ranged from a few hundred nanometers to ~1 micrometer, in consistent with the lateral size observed in AFM height profile analysis shown in FIG. 7A-FIG. 7D.

Graphene flakes produced by direction sonication of graphite/NMP suspension exhibit lateral size ~1 micron and thickness of ~5 nm, as can be seen in FIG. 9A. TEM & SED characterization (shown in FIGS. 10A and 10B) also shows few-layered graphene flakes with lateral size ~1 micron.

Figures 11A, 11B:
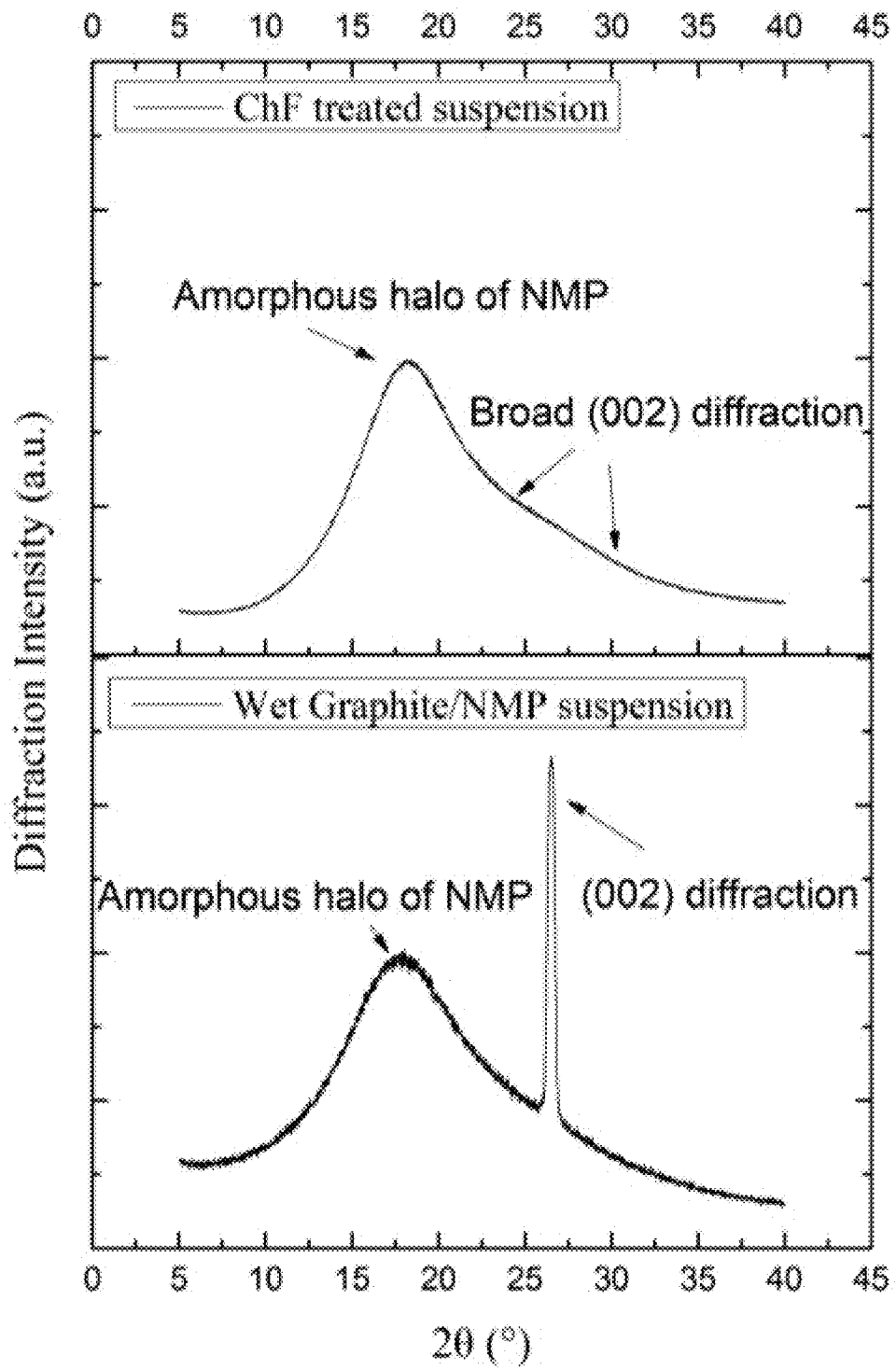
FIG. 11A is an XRD spectrum of ChF treated graphite/NMP suspension.
FIG. 11B is an XRD spectrum of untreated graphite/NMP suspension.
Figure 11C:
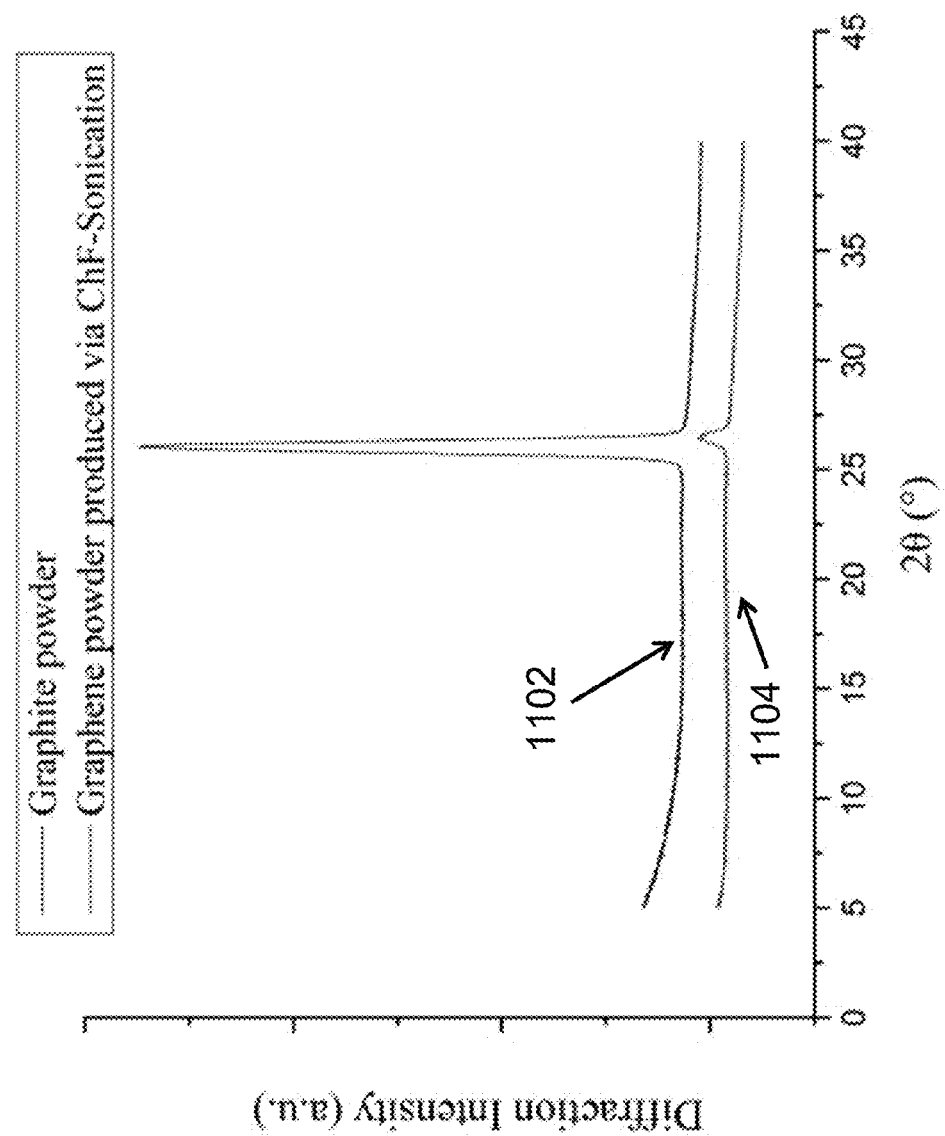
FIG. 11C is a graph of powder XRD patterns of completely dried graphite powder (curve 1102) and ChF-Sonication graphene (curve 1104)

As can be seen in FIG. 11A and FIG. 11B, the (002) diffraction peak of graphite evolved to a broad diffraction with greatly declined diffraction intensity after being treated by chaotic flow, suggesting the starting of breaking-down of the stacks (delamination) and probably confined NMP molecules in between graphite layers. The powder diffraction XRD experiment (FIG. 11C) indicates the occurrence of exfoliation as the 26.5° diffraction peak significantly declined. The residual (002) diffraction detected in ChF-sonication produced graphene powder could be ascribed to re-aggregation and re-stacking of graphene flakes during solvent evaporation.

As can be seen in FIG. 12A, the chaotic flow also exfoliates graphite producing detectable graphene flakes. The reason could be the severe shearing and stretching of the suspension when flowing around the pebbles, as shear in liquid environment was recently reported as another feasible approach to achieve exfoliation of graphite.[12] It also could be due to collision-induced "dog-ears", which came off from graphite particles and dispersed in NMP as exfoliated flakes.

Figure 13:
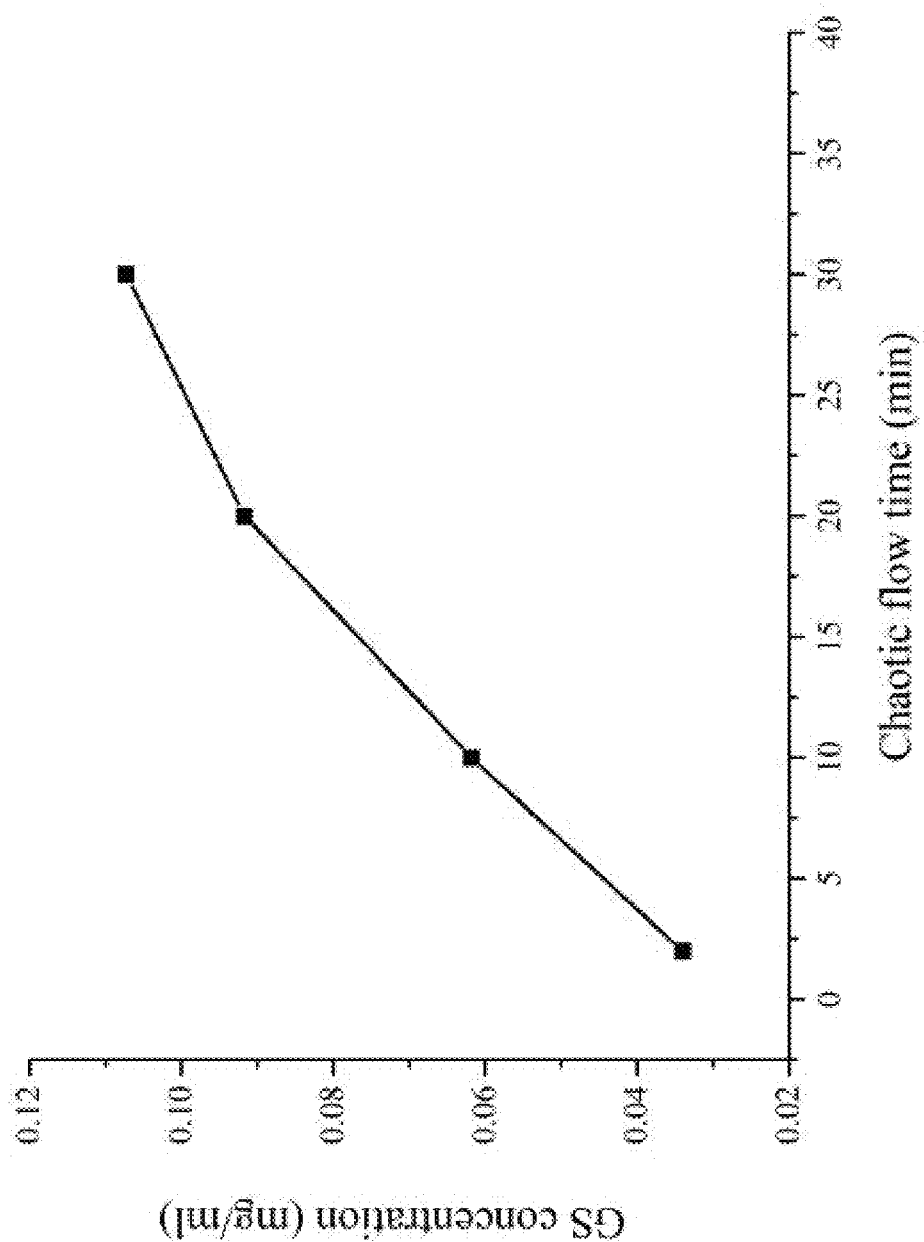
FIG. 13 is a graph of graphene concentration after chaotic flow treatment and centrifugation as a function of chaotic flow time.

As shown in FIG. 13, the concentration of GS in the supernatant increases when prolonging the chaotic flow time. 2 min of chaotic flow produces relatively low yield concentration of GS flakes (0.034 mg/ml).

PROCESS EMBODIMENTS

List of Components Shown in FIG. 14-FIG. 21

Figure 14:
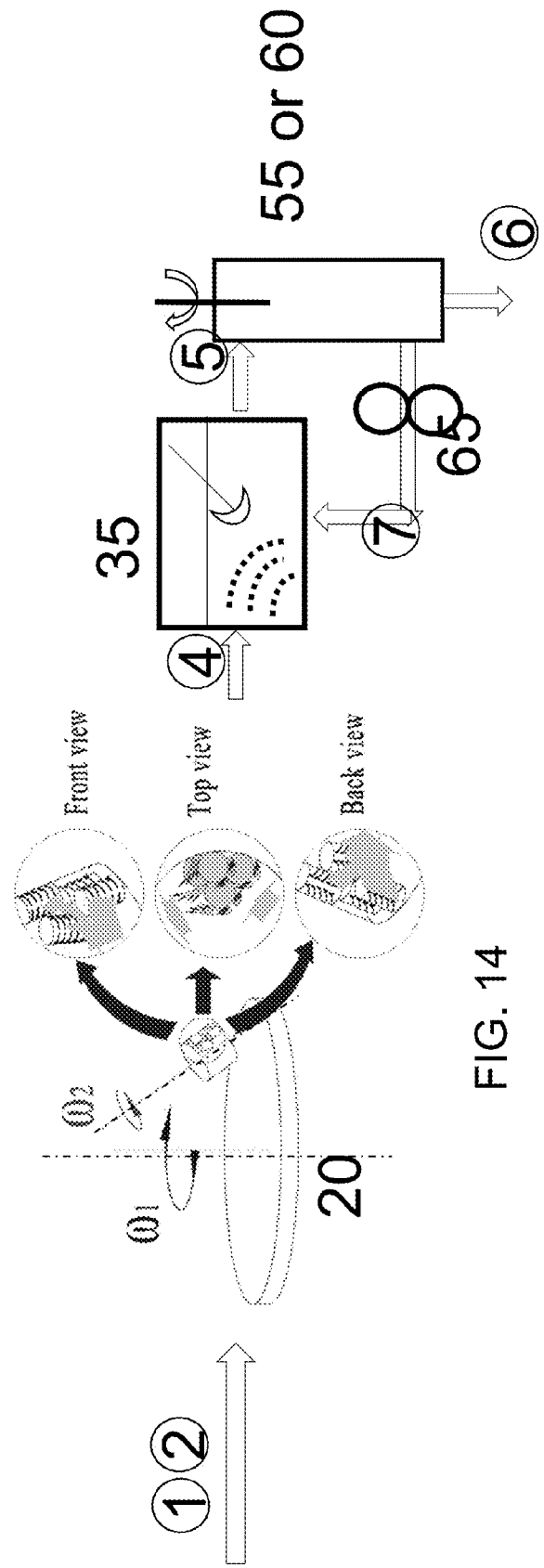
FIG. 14 is a schematic diagram of one embodiment of a batch or semi continuous graphene exfoliation process.

1 graphite particles (feed)
2 carrying fluid (feed)
3 slurry
4 flow modified graphite (including a fraction of graphene)
5 flow+sonication treated slurry
6 stream of suspended graphene (supernatant) contains the desired product
7 recycling slurry stream
10 Powder/liquid mixer (Silverson Flashmix, for instance)
15 Gear pump for main feed
20 Planetary mixer/grinder
25 Batch mixer/grinder
30 Continuous mixer/grinder
35 Bath sonicator
40 Sonication channel
45 High intensity sonicator rods
50 Agitators (such as laboratory stirrers; slight agitation is expected to be sufficient)
55 batch centrifuge
60 continuous centrifuge
65 Gear pump for slurry recirculation
70 Pump for slurry recirculation FIG. 14 is a schematic diagram of one embodiment of a batch or semi continuous graphene exfoliation process.

In the process shown in FIG. 14 a regular sonication bath (bath sonicator) is used. The material being process is caused to re-circulate through a centrifuge. In some embodiments the centrifuge is run batch-wise with discontinuous recirculation of sediment slurry. There is intermittent feed from the mixer/grinder. The crescent symbol and the three dotted curves symbolize a sonication process.

Figure 15:
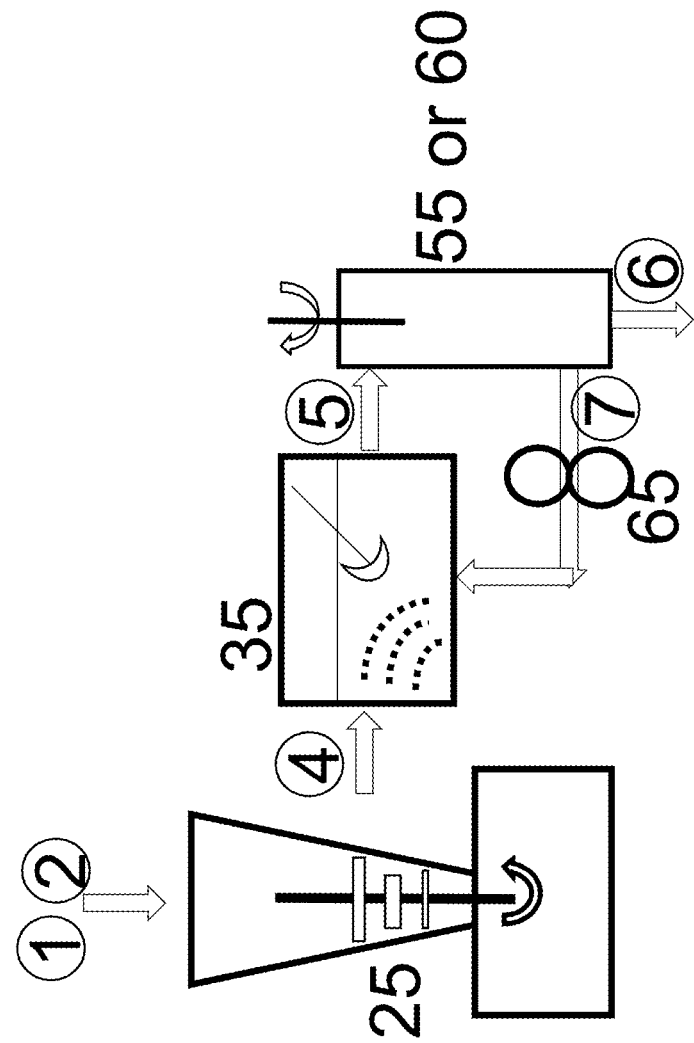
FIG. 15 is a schematic diagram of another embodiment of a batch or semi continuous graphene exfoliation process.

FIG. 15 is a schematic diagram of another embodiment of a batch or semi continuous graphene exfoliation process.

In the process shown in FIG. 15 a regular sonication bath is used. In some embodiments the centrifuge is run batch-wise with discontinuous recirculation of sediment slurry. There is intermittent feed from the mixer/grinder. There may be a variation in the mixer/grinder mechanism used.

Figure 16:
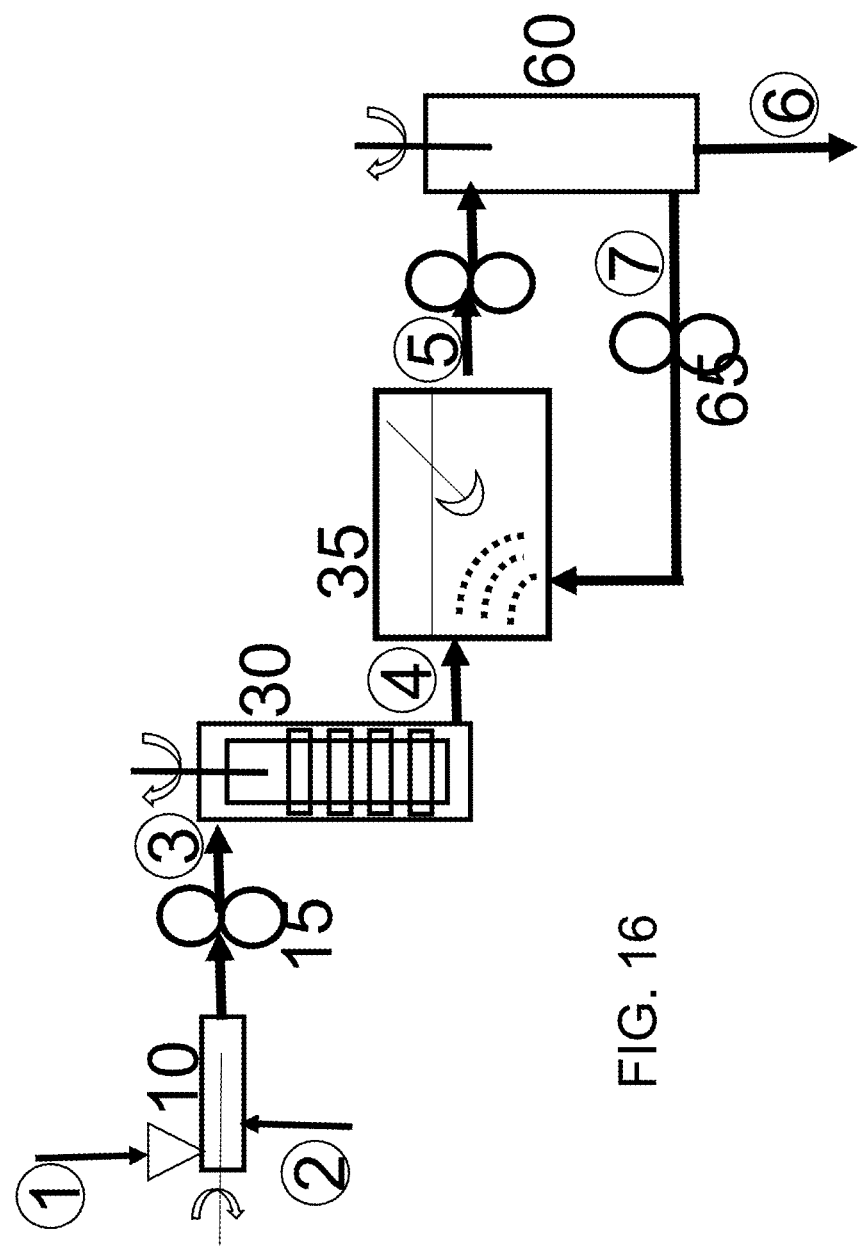
FIG. 16 is a schematic diagram of one embodiment of a continuous graphene process using recirculation without a grinder/mixer.

FIG. 16 is a schematic diagram of one embodiment of a continuous graphene process using recirculation with a single pass through the sonication system (e.g., without going through a grinder/mixer apparatus again).

In the process shown in FIG. 16 a regular sonication bath is used. In some embodiments the sediment slurry is circulated through the centrifuge.

Figure 17:
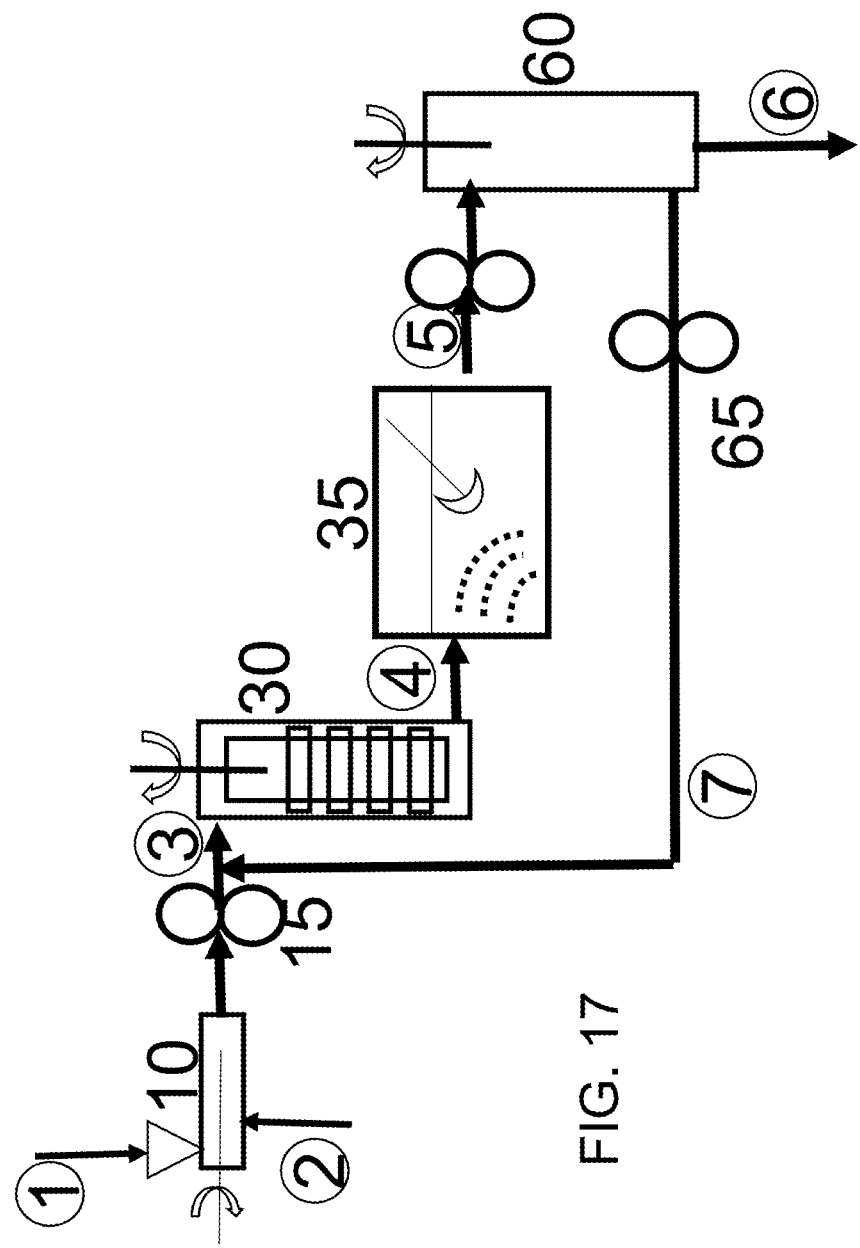
FIG. 17 is a schematic diagram of one embodiment of a continuous graphene process with recirculation through a grinder/mixer.

FIG. 17 is a schematic diagram of one embodiment of a continuous graphene process with recirculation through a grinder/mixer.

In the process shown in FIG. 17 a regular sonication bath is used. The process includes circulation through a centrifuge.

Figure 18:
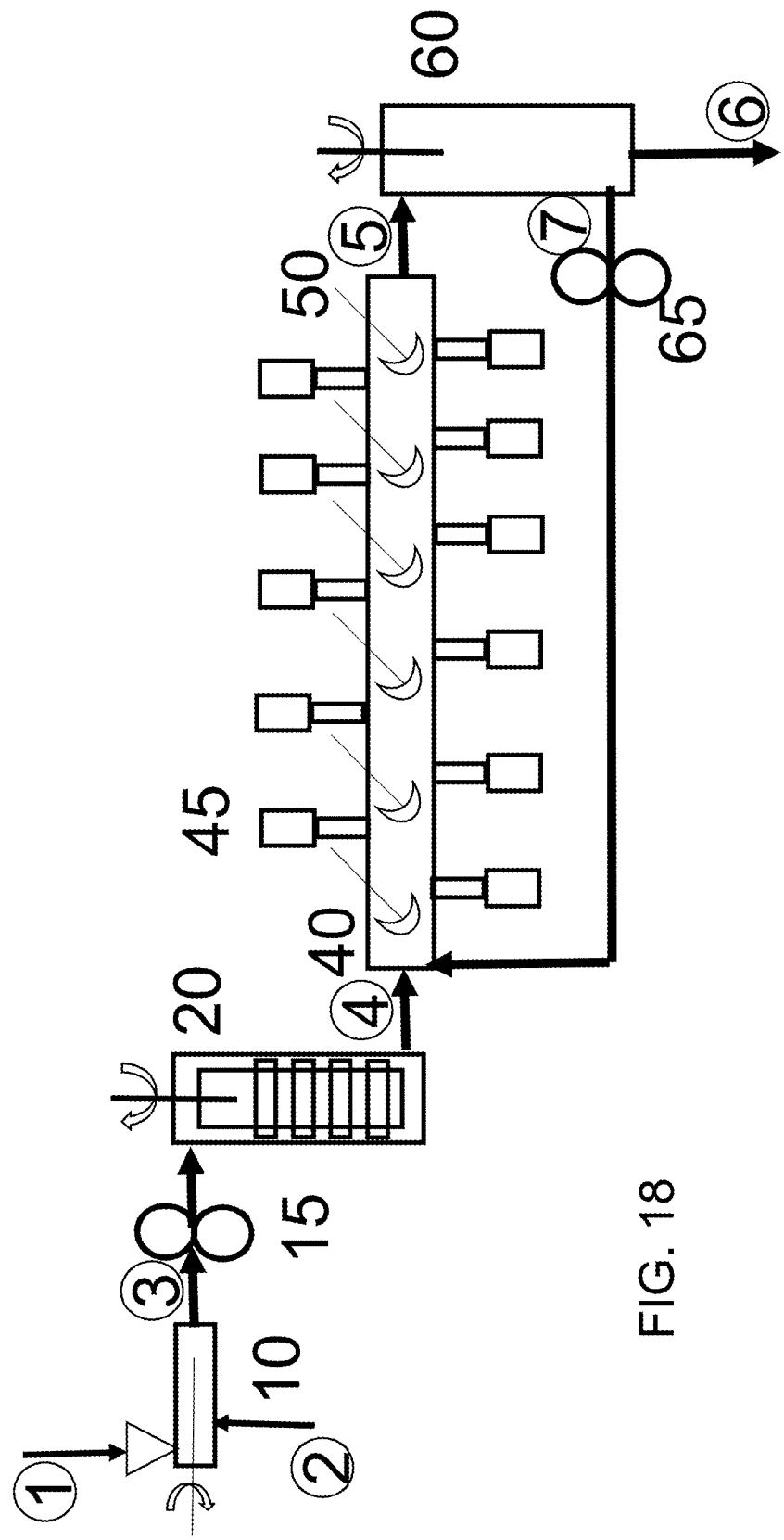
FIG. 18 is a schematic diagram of one embodiment of a continuous graphene process that uses recirculation without a grinder/mixer.

FIG. 18 is a schematic diagram of one embodiment of a continuous graphene process that uses recirculation with a single pass through the sonication system (e.g., without going through a grinder/mixer apparatus again).

Figure 19:
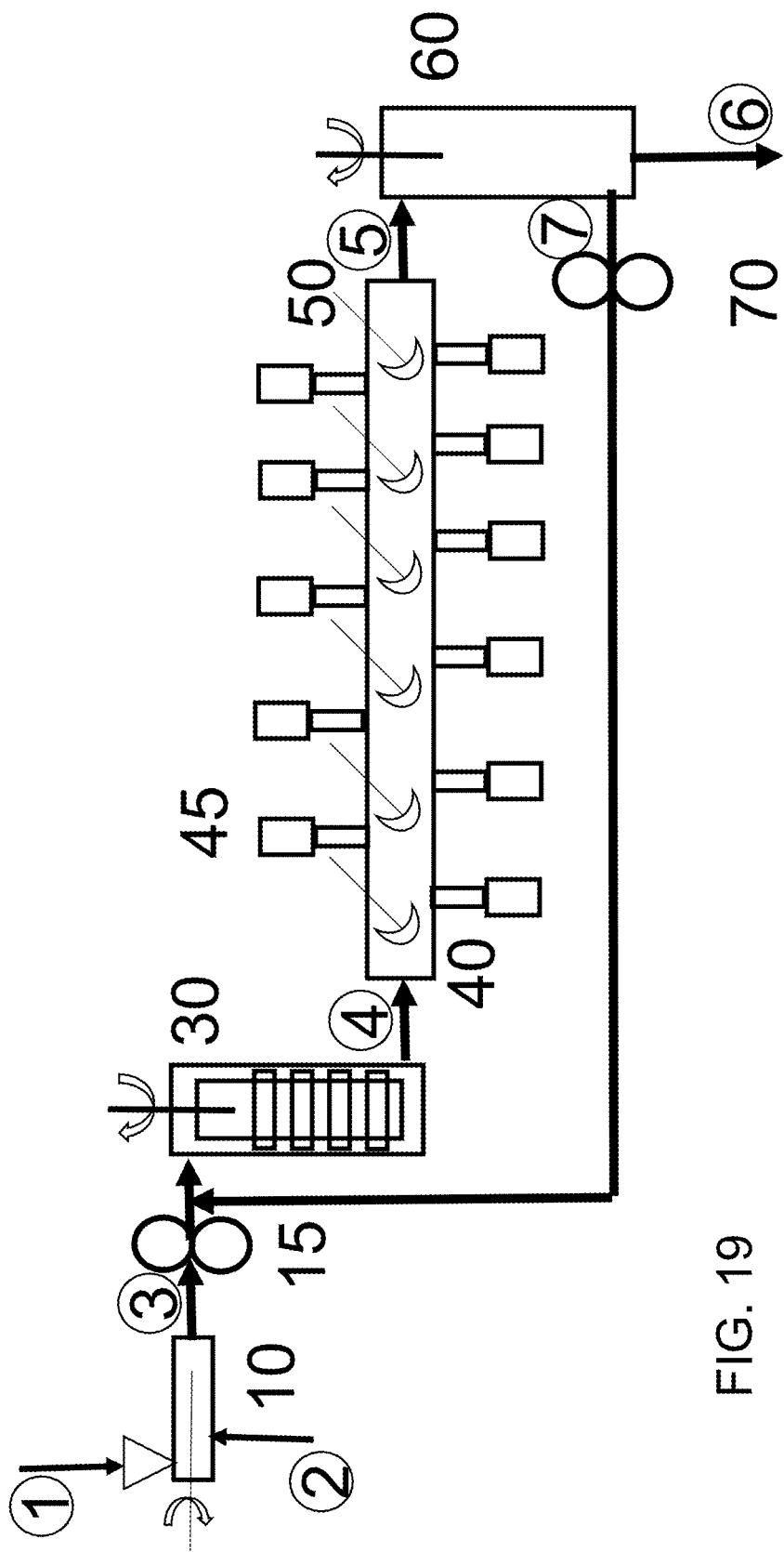
FIG. 19 is a schematic diagram of one embodiment of a continuous graphene process with recirculation through a grinder/mixer.

FIG. 19 is a schematic diagram of one embodiment of a continuous graphene process with recirculation through a grinder/mixer.

Figure 20:
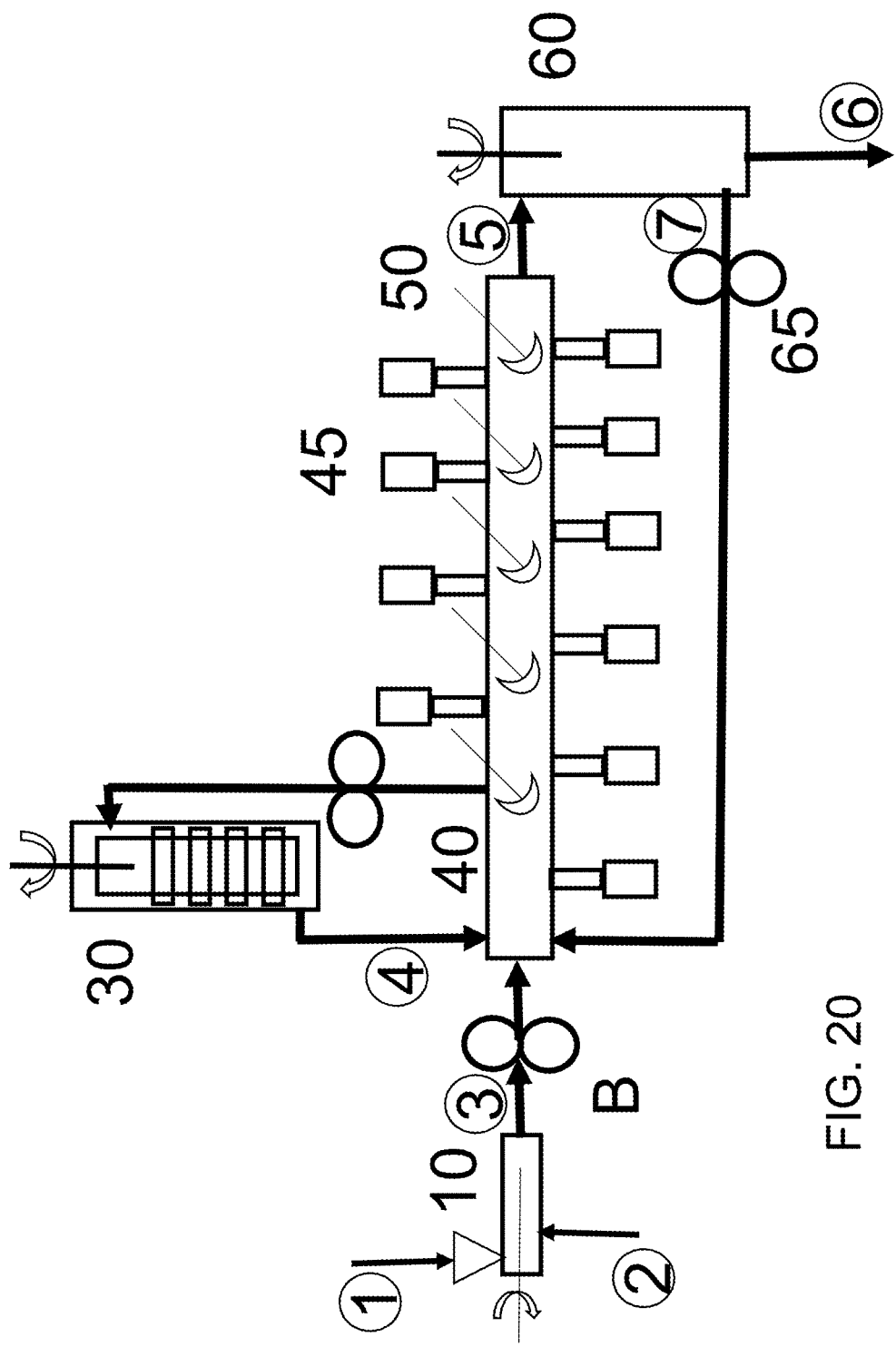
FIG. 20 schematically illustrates features of a continuous graphene process with flow treatment by slurry circulation through mixer/grinder on the side of the sonication channel that operates according to principles of the invention.

FIG. 20 is a schematic diagram of one embodiment of a continuous graphene process with recirculation through a grinder/mixer after the slurry has partially gone through the sonication channel.

A solid bowl centrifuge is a type of centrifuge that uses the principle of sedimentation. A centrifuge is used to separate a mixture that consists of two substances with different densities by using the centrifugal force resulting from continuous rotation. It is normally used to separate solid-liquid, liquid-liquid, and solid-solid mixtures. Solid bowl centrifuges are widely used in various industrial applications, such as wastewater treatment, coal manufacturing, and polymer manufacturing. One advantage of solid bowl centrifuges for industrial uses is the simplicity of installation compared to other types of centrifuge. There are three design types of solid bowl centrifuge, which are conical, cylindrical, and conical-cylindrical.

FIG. 21 schematically illustrates features of a continuous graphene process using two centrifuges. The first centrifuge operates at low g-force to remove larger graphite particles for recirculation through a grinder/mixer. The second centrifuge operates at high g-force to remove remaining small graphite particles for returning them into the sonication bath or sonication channel (not shown). Sediment recycling can be performed after passing through either centrifuge.

DISCUSSION OF PROCESS EMBODIMENTS

The exfoliation of graphite into graphene (preferably single layer, double layer, triple layer) occurs in a sequence of processing steps which in some embodiments have the following features.

A suspension of graphene particles (1) in a suspending fluid (2) is generated. Such suspension and its modified states will be called "slurry" in the following description.

The slurry is treated in a mixer/grinder (20, 25, 30) for modification of the graphite particles. Mixer/grinder operating conditions and residence time determine the extent of edge modification of the graphite particles.

A small fraction of the graphite may already exfoliate due to the mixer/grinder action, which could be extracted if desired.

In some embodiments, the resulting slurry (4) gets fed into a sonication bath (35) or a sonication flow channel (40) for sonication treatment.

In some embodiments, the sonicator channel (40) is equipped with at least one sonicator rod (45).

In some embodiments, the settling of graphite particles is counteracted by agitation in an agitator (50) or by rotating the bath (35) or rotating the channel (40).

In some embodiments, a stream of slurry (5) is fed into a centrifuge (55), which may be operated in batch mode, in continuous mode, or in semi continuous mode (one stream continuous and the sediment collection in batch mode). The centrifuge separates the slurry into the supernatant (6) and a sediment concentrate (7). The ratio of supernatant and sediment concentration can be adjusted by varying the value of the g-value of the centrifuge. The g-value is understood here as the relative centrifugal force in comparison to Earth's gravitational force. Instead of one centrifuge, a sequence of two centrifuges may be used where the g-value of the second centrifuge is at least twice the g-value of the first one. In this case, the supernatant of the first centrifuge gets fed into the second centrifuge. The sediment concentrate gets re-dispersed in a liquid and recycled either directly into the sonication bath (35) or sonication channel (40), or through the mixer/grinder (30).

In some embodiments, the stream of supernatant (6) gets further processed for stabilization of the graphene and extraction.

Semi-continuous operation may be used in some embodiments. An intermittently operated mixer/grinder (20, 25) may be combined with a continuously operating loop of sonication (35, 40) followed by centrifuging in a continuous centrifuge (60) and recirculation of (7) directly into the sonication section (35, 40).

The effect that a sequence of flow treatment and sonication has on exfoliation can be quite dramatic. Both continuous and batch-wise reprocessing of sediment significantly increases the exfoliation yield, shortens of the process time, and reduces the mechanical damaging of the graphene during exfoliation. Graphene yield from sonication was increased several fold due to the flow treatment before sonicating.

We extend this to a more general process in which applying a sequence of two different exfoliation methods to a graphite suspension.

It is believed there is a benefit in using a sequence of flow treatment and supercritical fluid exposure (two different methods in sequence again).

In our experience, a very brief grinding/mixing flow results in sufficient edge modifications of graphite particles (2 min for instance in the published report). This extremely short process time is of great advantage for our overall process design.

A continuous process in which the sequence of flow treatment and sonication offers itself as ideal process configuration for continuous or semi-continuous operation. Due to our discovery, the overall processing time is cut down to a level where a continuous exfoliation process becomes viable. The continuous process includes a loop for reprocessing of unexfoliated graphite (either through the flow treatment again or directly to extended sonication).

The suspension fluid for the process preferably is an organic liquid or a surfactant.

The suspending liquid may be also be an ionic liquid.

In some embodiments, the flow treatment involves a flow with rapid liquid streams dividing around and recombining between pebbles, which causes interparticle and particle-pebble collisions.

In some embodiments, the flow treatment caused the graphite plates to comprise bent edges and corners, such bent edges and corners facilitating the entrance of solvent molecules between the graphene layers in the graphite flakes during sonication, which in turn enhances the graphene flake production yield.

In some embodiments, after flow treatment, the suspension gets sonicated without removal of any fraction of graphite or graphene.

In some embodiments, the process uses centrifugation speed as a means to control the ratio of supernatant to suspension with graphite for reprocessing

DEFINITIONS

As used herein, the term "pebbles" is intended to mean a type of grinding particle. In general, grinding particles are made of materials that are harder than the material that is intended to be ground or attritted. Typical materials from which such grinding particles are made include ceramics, metals, metal carbides and metal nitrides.

THEORETICAL DISCUSSION

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

INCORPORATION BY REFERENCE

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A sequential process for exfoliation of graphite to produce graphene flakes with a thickness of one to three graphene layers, comprising the steps of:
   (a) creating a first suspension of a graphitic material in a first liquid;
   (b) treating said first suspension in a flow treatment, the flow treatment being sufficiently benign that the number of at least one of bent edges and bent corners is increased without reducing the lateral size of the graphitic particles below 10 microns;
   (c) centrifuging said first suspension created in step (b) to create a supernatant and a sediment;
   (d) separating of said supernatant from said sediment;
   (e) dispersing said sediment in a second liquid to create a second suspension;
   (f) sonicating said second suspension that resulted from step (e);

(g) centrifuging said second suspension that resulted from step (f);
(h) separating said second suspension into a second supernatant and a second sediment;
(i) recovering at least one graphene flake having a thickness of one to three graphene layers from said second supernatant; and
(j) dispersing said second sediment in a third liquid to create a third suspension for recirculation.

2. The sequential process of claim 1, wherein said graphitic material is pristine graphite.

3. The sequential process of claim 1, wherein said first liquid used in step (a) is N-methyl pyrolidone.

4. The sequential process of claim 1, wherein said second liquid used in step (e) is N-methyl pyrolidone.

5. The sequential process of claim 1, wherein said first liquid used in step (a) or said second liquid used in step (e) comprises N-methyl pyrolidone.

6. The sequential process of claim 1, wherein step (b) involves the use of grinding particles.

7. The sequential process of claim 1, wherein either centrifuging step is performed in a solid bowl centrifuge.

8. The sequential process of claim 1, further comprising the step of adding fluid to said suspension of unexfoliated graphite from the centrifuge before pumping it into the step of sonication.

9. A sequential process for exfoliation of graphite to produce graphene flakes with a thickness of one to three graphene layers, comprising the steps of:
(a) creating a first suspension of a graphitic material in a first liquid;
(b) treating said first suspension in a flow treatment, the flow treatment being sufficiently benign that the number of at least one of bent edges and bent corners is increased without reducing the lateral size of the graphitic particles below 10 microns;
(c) sonicating said first suspension that resulted from step (b);
(d) centrifuging said first suspension that resulted from step (c);
(e) separating said first suspension into a supernatant and a sediment;
(f) recovering at least one graphene flake having a thickness of one to three graphene layers from said supernatant; and
(g) dispersing said sediment in a second liquid to create a second suspension for recirculation.

10. The sequential process of claim 9, wherein said graphitic material is pristine graphite.

11. The sequential process of claim 9, wherein said first liquid used in step (a) or said second liquid used in step (g) comprises N-methyl pyrolidone.

12. The sequential process of claim 9, wherein step (b) involves the use of pebbles.

13. The sequential process of claim 1, further comprising, upon recirculation of the third suspension, performing a further flow treatment and a further sonicating.

14. The sequential process of claim 9, further comprising, upon recirculation of the second suspension, performing a further flow treatment and a further sonicating.

* * * * *